US011265375B2

(12) United States Patent
Liberti

(10) Patent No.: US 11,265,375 B2
(45) Date of Patent: Mar. 1, 2022

(54) DEVICES AND METHODS FOR TRANSMITTING DISTRIBUTED DATA

(71) Applicant: Perspecta Labs Inc., Basking Ridge, NJ (US)

(72) Inventor: Joseph C. Liberti, Basking Ridge, NJ (US)

(73) Assignee: PERSPECTA LABS INC., Basking Ridge, NJ (US)

( * ) Notice: Subject to any disclaimer, the term of this patent is extended or adjusted under 35 U.S.C. 154(b) by 24 days.

(21) Appl. No.: 16/847,172

(22) Filed: Apr. 13, 2020

(65) Prior Publication Data
US 2020/0329099 A1 Oct. 15, 2020

Related U.S. Application Data

(60) Provisional application No. 62/833,175, filed on Apr. 12, 2019.

(51) Int. Cl.
H04L 29/08 (2006.01)
H04W 56/00 (2009.01)
(Continued)

(52) U.S. Cl.
CPC ........... H04L 67/1095 (2013.01); H04B 1/02 (2013.01); H04B 1/06 (2013.01); H04B 7/024 (2013.01);
(Continued)

(58) Field of Classification Search
None
See application file for complete search history.

(56) References Cited

U.S. PATENT DOCUMENTS

2011/0002406 A1* 1/2011 Ming ................ H04L 25/03904
375/260
2012/0002611 A1* 1/2012 You ........................ H04L 1/1854
370/328
(Continued)

OTHER PUBLICATIONS

Sairam Goguri, Raghuraman Mudumbai, D. Richard Brown III, Soura Dasgupta and Upamanyu Madhow, Capacity Maximization for Distributed Broadband Beamforming, pp. 3441-3445, Proceedings of 41st International Conference on Acoustics, Speech and Signal Processing (Year: 2016).*

(Continued)

Primary Examiner — Christopher M Crutchfield
(74) Attorney, Agent, or Firm — Heslin Rothenberg Farley & Mesiti, P.C.

(57) ABSTRACT

A method of transmitting distributed data over a channel includes distributing data from a data source to N number of collaborating transmitter devices operable to synchronously transmit N number of contributing data signals based on the data to a receiver over a channel. Channel state information of the channel between each transmitter device and the receiver is obtained. A spatial spectral weight (SSW) filter for each transmitter device based on the obtained channel state information is determined. The SSW filter associated with each transmitter device is applied to each contributing data signal transmitted from the associated transmitter device. The N number of contributing data signals filtered by the SSW filters are transmitted through the channel to the receiver, such that the contributing data signals are received at the receiver synchronously and in substantial phase alignment such that the contributing data signals coherently combine to form a coherently combined data signal.

19 Claims, 18 Drawing Sheets

(51) Int. Cl.
| | |
|---|---|
| *H04B 1/06* | (2006.01) |
| *H04B 7/06* | (2006.01) |
| *H04B 1/02* | (2006.01) |
| *H04W 52/30* | (2009.01) |
| *H04L 5/00* | (2006.01) |
| *H04W 16/28* | (2009.01) |
| *H04B 7/024* | (2017.01) |
| *H04L 67/1095* | (2022.01) |

(52) U.S. Cl.
CPC ......... *H04B 7/0626* (2013.01); *H04L 5/0035* (2013.01); *H04W 16/28* (2013.01); *H04W 52/30* (2013.01); *H04W 56/0005* (2013.01)

(56) References Cited

U.S. PATENT DOCUMENTS

| | | | | |
|---|---|---|---|---|
| 2013/0010702 | A1* | 1/2013 | Aminaka | H04W 76/15 370/328 |
| 2013/0039349 | A1* | 2/2013 | Ebrahimi Tazeh Mahalleh | H04B 7/024 370/336 |
| 2019/0268804 | A1* | 8/2019 | Estella Aguerri | H04B 7/0626 |

OTHER PUBLICATIONS

Raghuraman Mudumbai, D. Richard Brown III, Upamanyu Madhow, H. Vincent Poor, Distributed Transmit Beamforming: Challenges and Recent Progress, pp. 102-110 (Year: 2009).*

Ymg-Szu Tu and Gregory J. Pome, Coherent Cooperative Transmission From Multiple Adjacent Antennas to a Distant Stationary Antenna Through AWGN Channels, pp. 130-134, 2002) and Garg (V. Garg, Wireless Communications & Networking, pp. 47-84 (Year: 2007).*

V. Garg, Wireless Communications & Networking, pp. 47-84 (Year: 2007).*

Ye Wang , Weixia Zou, and Yunzheng Tao, Analog Precoding Designs for Millimeter Wave Communication Systems, pp. 11733-11745 (Year: 2018).*

Navod Suraweera, Stephen V. Hanly and Philip Whiting, Distributed Beamforming for the Multicell Sparsely-Spread MC-CDMA Downlink, pp. 1-5 (Year: 2017).*

T. Bidigare, D. Brown, Wideband Distributed Transmit Beamforming using Channel Reciprocity and Relative Calibration, pp. 1-5 (Year: 2015).*

M. Gencel, Algorithms and Protocols for Wideband Distributed Beamforming, pp. 1-102 (Year: 2018).*

M. Gencel, M. Rasekh, U. Madhow, Noise-resilient scaling for wideband distributed beamforming, pp. 1-5 (Year: 2015).*

* cited by examiner

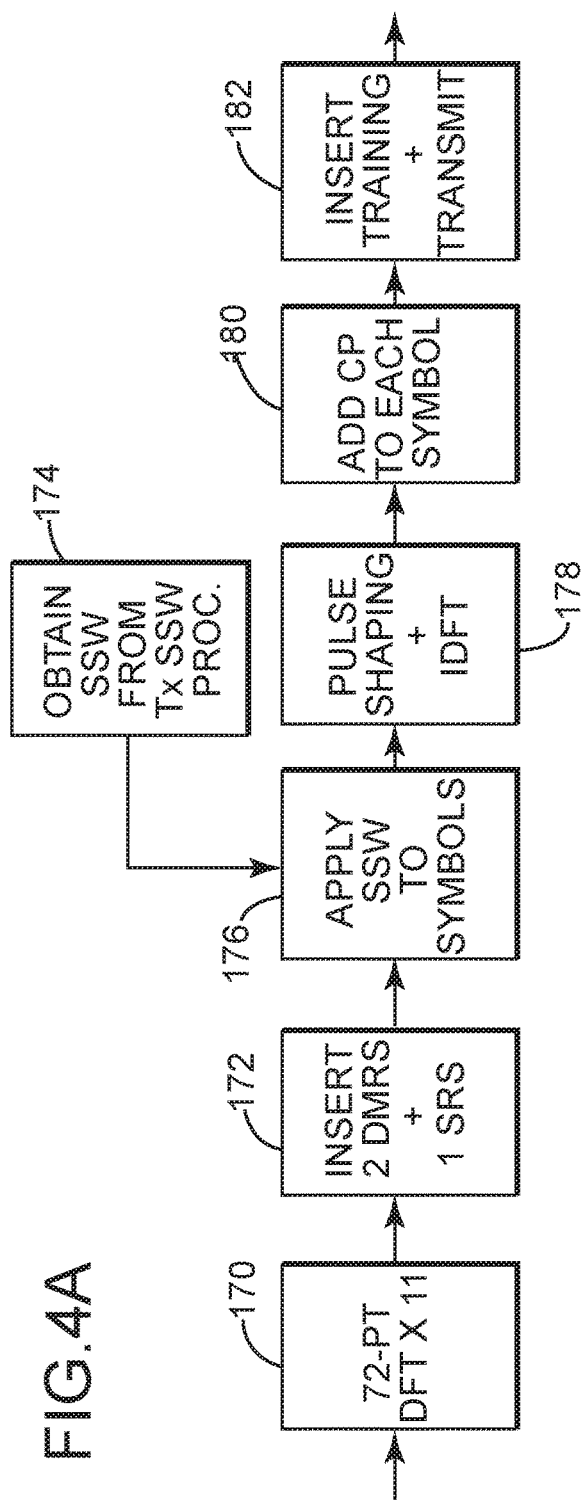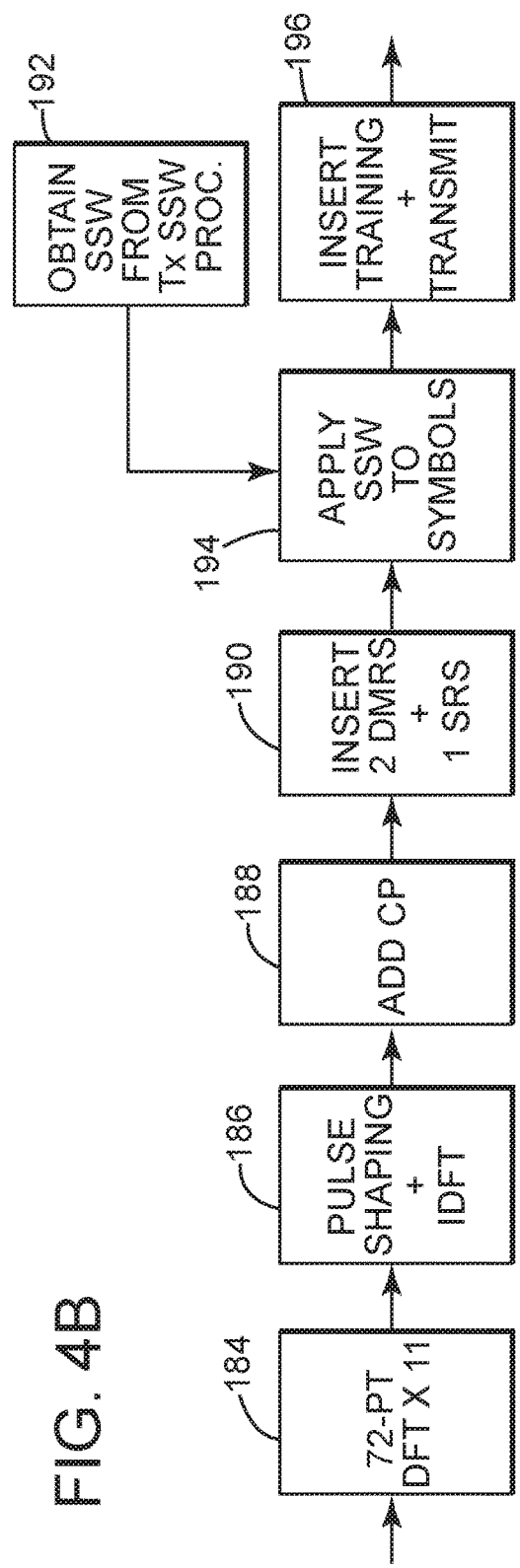

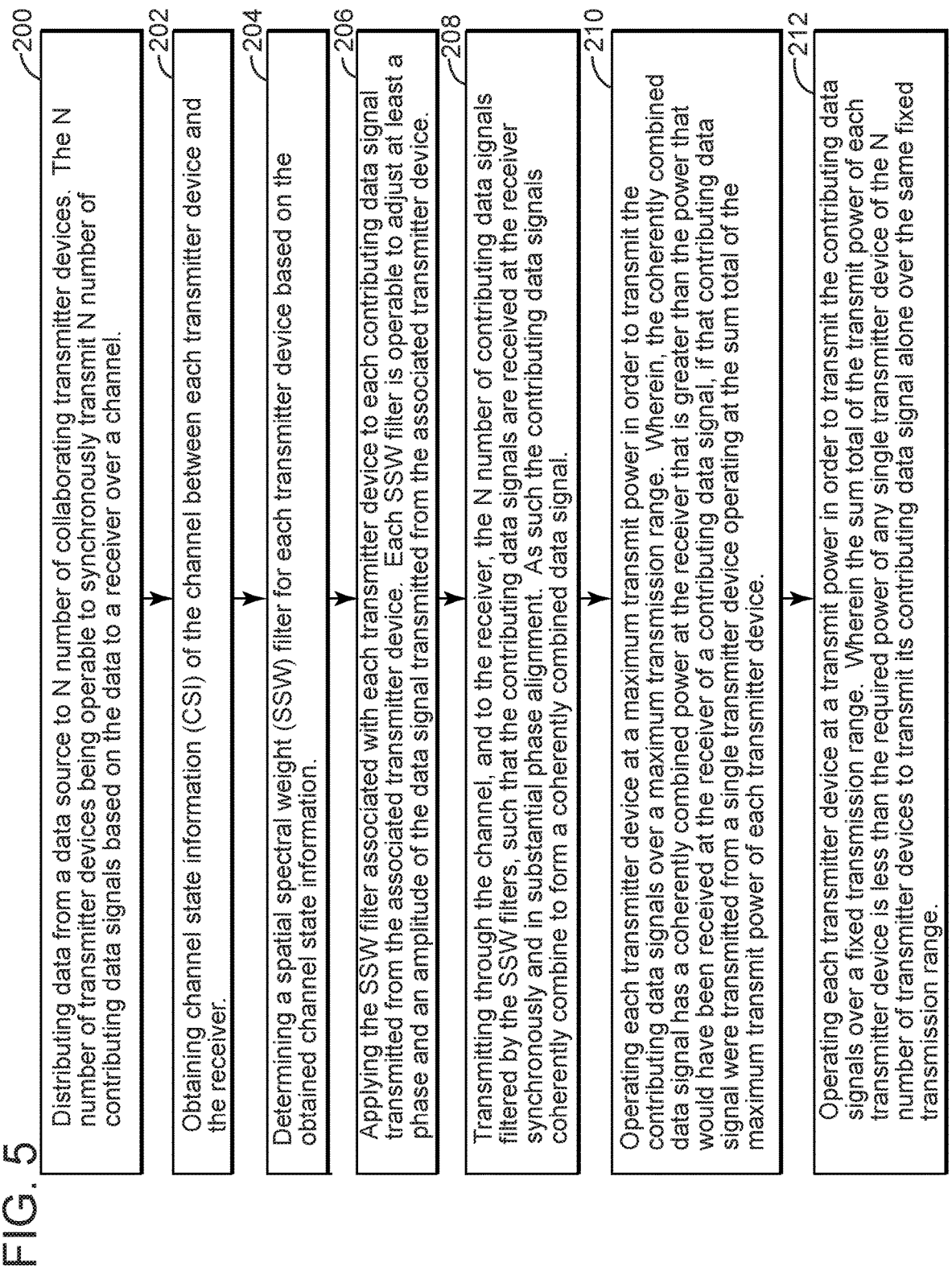

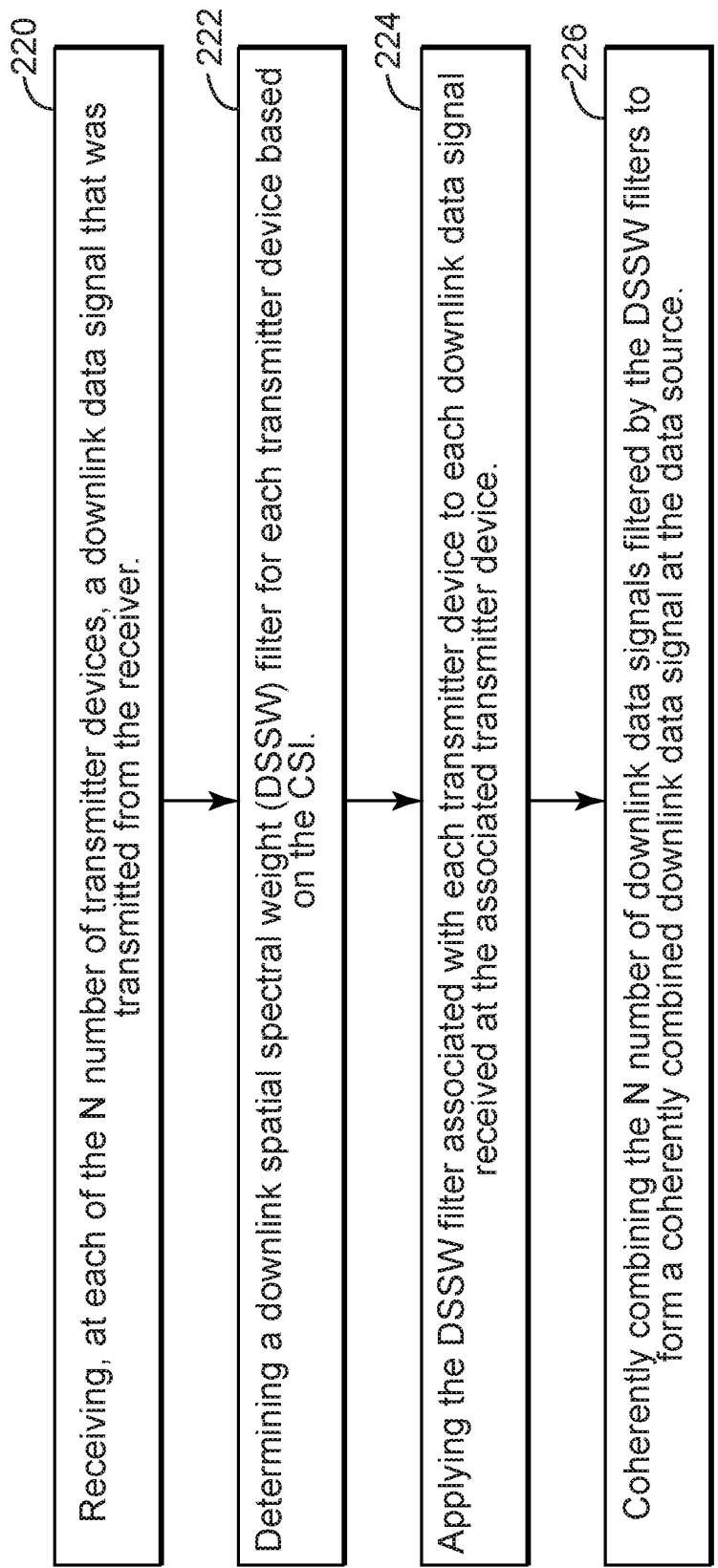

DEVICES AND METHODS FOR TRANSMITTING DISTRIBUTED DATA

CROSS-REFERENCE TO RELATED APPLICATION

This patent application perfects and claims priority benefit to U.S. Provisional Patent Application No. 62/833,175, filed Apr. 12, 2019, and entitled DEVICES AND METHODS FOR TRANSMITTING DISTRIBUTED DATA, which is hereby incorporated herein by reference in its entirety.

TECHNICAL FIELD

The present disclosure relates to devices and methods for transmitting data over a channel between transmitter devices and a receiver. More specifically, the disclosure relates to devices and methods of transmitting distributed data utilizing N number of collaborating transmitter devices operable to synchronously transmit N number of contributing data signals based on the data to a receiver over a channel.

BACKGROUND

Transmitter devices, such as radios and cellular telephones, are limited in the amount of transmission range that they can achieve by several factors, most notably of which is the transmitter device's maximum transmit power. Typically, a transmitter device has to be within a few kilometers of a receiver, such as a base station tower, in order to be able to establish a communication link with that receiver and transmit a signal to that receiver. Often times though, there is a need to increase the range that a single unassisted transmitter device can attain with a fixed maximum transmit power. For example, in the case of a weather event wherein some base stations may be damaged. By way of another example, in the case of rugged terrain wherein base station towers may be scarcely distributed.

Transmitter devices also require a certain amount of power to close a communications link to a receiver that is within its transmission range. However, there is often a need to reduce the amount of power required to close that communications link. For example, in the case a military application, where there is a concern about the transmitter devices being detected, the less power required to close a communications link the better.

Additionally, reducing overall transmit power to transmit data over a communication link to a receiver causes less interference with other communication links by other transmitter devices using the same receiver. Reducing overall power required to achieve a given rate of data transmission between a transmitter device and a receiver, reduces the amount of separation required between links using the same radio resources.

Accordingly, there is a need for methods and devices that can extend the range of transmission for a transmitter device having a fixed maximum transmit power. Additionally, there is a need for methods and devices that can reduce the required amount of power to close a communication link between a transmitter device and a receiver.

Glossary

Channel: A channel herein includes a predetermined coherence frequency bandwidth that a waveform transmits through from initial transmission at the transmitter device to final reception at the receiver. The channel may extend through a number of analog and radio frequency circuits and antennas.

Channel State Feedback is a means by which CSI information is estimated at the receiver (typically the eNodeB or eNodeB DBF appliqué) and converted to the UE DBF transmitters via a feedback channel. Techniques such as Grassmannian Line Packing (GLP) can be used to efficiently convey CSI over the feedback channel.

Channel State Information (CSI): Information about the channel impulse response or transfer function between each transmitter and the receiver. CSI, among other things, will provide information on the type and magnitude of distortions, such as amplitude attenuation, phase shifting, added noise and/or Doppler shifts, in the channel that a data signal will be subject to. Essentially, CSI provides the transfer function of the channel relative to the data signals traveling through the channel.

CGAN (Collaborating Group Area Network): A local area network share by a collaborating group of transmitter devices.

Coherence Frequency Bandwidth (or Coherence Bandwidth): A statistical measurement of the range of frequencies over which the channel can be considered "flat", or in other words the approximate maximum bandwidth or frequency interval over which two frequencies of a signal are likely to experience comparable or correlated amplitude fading.

Coherent Signal Combination: A mode of signal combination in which signals are aligned in phase. If N equal-power signals are combined coherently, also known as "substantially in-phase" or "phase-aligned", the result will have up to power $N^2$ times the power received from any individual node. If signals combine non-coherently, the average resulting power will be just up to N times the power received from any individual node.

Collaborative Cluster or Collaborative Group: A group of nodes (transmitter devices) which collaborate to coherently transmit a message to a distant receiver. Typically a collaborating group area network, or CGAN, connects the nodes in the collaborative cluster.

CP: A cyclic prefix (CP) is used to simplify channel equalization (to mitigate the effects of multipath) at the receiver. In an LTE system, a cyclic prefix is a guard period disposed between symbols and used to prevent intra symbol interference.

DBF signal processing system: A DBF signal processing system (like LTE-DBF Appliqué 124 of FIG. 2, IM-DBF 154 of FIG. 3, UEDA-S 165 of FIG. 7 and IM-DBF 168 of FIG. 8) is a DBF-enabling signal processing system that may attach to a commercial off the shelf (COTS) UE to enable distributing beamforming when the function is not present in native user equipment (UE) hardware.

Distributed Beamforming (DBF): An approach in which multiple nodes transmit a common signal with a phase adjustment or spatial spectral weight applied, so that the contributions from the transmitters combine coherently, meaning that the phases of the signals are aligned, at the intended receiver.

EDA: The eNodeB appliqué (EDA) is an appliqué signal processing system for the eNodeB (base station or receiver) which provides channel estimation and channel state feedback to enable DBF for an eNodeB which does not natively provide DBF functionality.

FD-DBF, TD-DBF, and ST-DBF: These are methods for applying the spatial spectral weight in DBF at each transmit node to achieve coherent combination at the receiver. In FD-DBF, a transfer function whose gain and phase response varies with frequency, is applied in the frequency domain at each transmitter. In TD-DBF, the equivalent operation is performed in the time domain. In ST-DBF, a single weight (with a gain and phase adjustment) is applied at each transmitter. As shown herein, the FD-DBF and TD-DBF methods perform comparably and the ST-DBF method underperforms FD-DBF and TD-DBF in wideband time-dispersive multipath channels.

LTE: Long Term Evolution (LTE) also known as $4^{th}$ generation cellular includes the set of waveforms widely used for text and data communications in modern cellular telephony networks. The handset in LTE systems is commonly called the UE (for User Equipment) and the base station is referred to as an eNodeB or eNB.

MAC or Medium Access Control scheme is used to manage which users can access radio spectrum resources at a given point in time. An example of a MAC is an RTS-CTS approach (for Request-to-Send/Clear-to-Send), in which a user requests are radio resource by sending a short RTS message, and only sends data if it is granted a CTS by a controller.

OFDM: Orthogonal Frequency Division Multiplexing or OFDM is a method in which a signal is constructed using a multitude of orthogonal subcarriers.

Signal Bandwidth: The signal bandwidth is the frequency band that contains the signal being transmitted. The signal bandwidth may be larger than, equal to, or less than the coherence bandwidth. A common measure of the signal bandwidth is the "3 dB bandwidth," wherein: if the peak power spectral density (PSD) occurs at frequency fc, and f1 is the frequency below fc at which the PSD is lower than the peak PSD by 3 dB, and f2 is the frequency above fc at which the PSD is lower than the peak PSD by 3 dB, then the "3 dB bandwidth" is equal to f2 minus f1.

Spatial Spectral Weight: The spatial spectral weight is a transfer function, which can be expressed as gain and phase shift as a function of frequency, that is applied at each transmitting node.

Spread Spectrum, DS and FH: Direct Sequence (DS) and Frequency Hopped (FH) spread spectrum are means of expanding the bandwidth of signals to lower power spectral density. This is done to lower detectability at a threat receiver (for military applications), or in commercial applications, to manage co-channel interference and to enable multiple users to access a common portion of the radio spectrum.

Time Division Duplex and Frequency Division Duplex: Duplexing is a means by which the uplink (UE-to-eNodeB) and downlink (eNodeB-to-UE) signals are separated. In Time Division Duplex (TDD) systems, the signals use the same radio spectrum, but at distinct time intervals. In Frequency Division Duplex (FDD) systems, the uplink and downlink portions each have dedicated spectrum allocations.

Time Division Multiple Access (TDMA): TDMA is a scheme by which multiple users access a common portion of radio spectrum (on the uplink or downlink) in time slots that are allocated as needed.

The present disclosure offers advantages and alternatives over the prior art by providing systems, devices and methods for utilizing a cluster of collaborating transmitter devices that can form a distributed beam for transmitting distributed data from the transmitter devices to a receiver over a channel. The cluster of transmitter devices are operable to transmit contributing data signals based on the distributed data to a receiver, wherein the contributing data signals are received at the receiver synchronously and substantially in phase. As such, the contributing data signals coherently combine to form a coherently combined data signal. The collaborating transmitter devices can transmit data over an extended range compared to a single unassisted transmitter device. The collaborating transmitter devices can also establish a communications link with less power required than a single unassisted transmitter device.

A computer implemented method of transmitting distributed data over a channel in accordance with one or more aspects of the present disclosure includes distributing data from a data source to N number of collaborating transmitter devices. The transmitter devices are operable to synchronously transmit N number of contributing data signals based on the data to a receiver over a channel. Channel state information of the channel between each transmitter device and the receiver is obtained. A spatial spectral weight (SSW) filter for each transmitter device based on the obtained channel state information is determined. The SSW filter associated with each transmitter device is applied to each contributing data signal transmitted from the associated transmitter device. The N number of contributing data signals filtered by the SSW filters are transmitted through the channel to the receiver, such that the contributing data signals are received at the receiver synchronously and in substantial phase alignment such that the contributing data signals coherently combine to form a coherently combined data signal.

A computerized system for transmitting distributed data over a channel in accordance with one or more aspects of the present invention includes N number of collaborating transmitter devices in a collaborating group. Each transmitter device includes a distributed beamforming (DBF) signal processing system, a user equipment (UE) device and a collaborating group area network communications device (CGAN comms). The DBF signal processing system includes at least one processor. The UE device is interfaced with the DBF signal processing system. The UE device is configured to transmit data to the DBF signal processing system. The CGAN comms is interfaced with the DBF signal processing system. The CGAN comms is configured to transmit data to the N number of transmitter devices over a collaborating group area network (CGAN). The transmitter devices of the collaborating group process data transmitted from a data source. The processing includes distributing the data from the data source to the N number of collaborating transmitter devices. The N number of transmitter devices are operable to synchronously transmit N number of contributing data signals based on the data from the data source to a receiver over a channel. Channel state information (CSI) of the channel between each transmitter device and the receiver is obtained. A spatial spectral weight (SSW) filter for each transmitter device based on the obtained channel state information is determined. The SSW filter associated with each transmitter device is applied to each contributing data signal transmitted from the associated transmitter device. The N number of contributing data signals filtered by the SSW filters are transmitted through the channel, and to the receiver, such that the contributing data signals are received at the receiver synchronously and in substantial phase alignment such that the contributing data signals coherently combine to form a coherently combined data signal.

DRAWINGS

The disclosure will be more fully understood from the following detailed description taken in conjunction with the accompanying drawings, in which:

FIG. 4A depicts a simplified block diagram of an exemplary embodiment of an FD-DBF algorithm in accordance with aspects of the present invention;

FIG. 4B depicts a simplified block diagram of an exemplary embodiment of a TD-DBF algorithm in accordance with aspects of the present invention;

FIG. 5 depicts a flow diagram that illustrates a computer implemented method of transmitting distributed data over an uplink channel in accordance with aspects of the present invention;

FIG. 6 depicts a flow diagram that illustrates a computer implemented method of transmitting distributed data over a downlink channel in accordance with aspects of the present invention;

DETAILED DESCRIPTION

Figure 1:
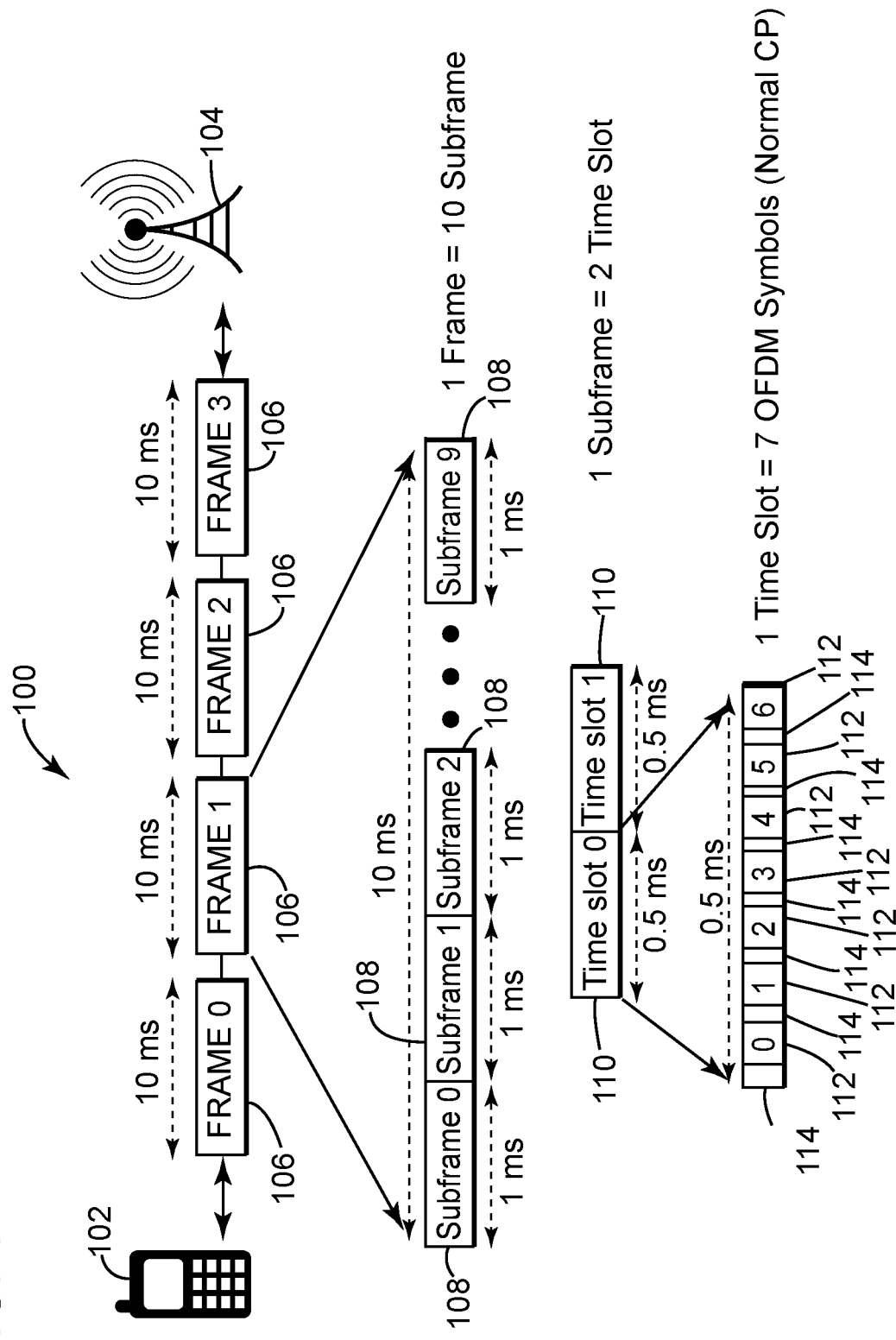
FIG. 1 depicts a typical program code implemented LTE waveform structure in accordance with aspects of the present invention.

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

Descriptions of well-known materials, fabrication tools, processing techniques, etc. are omitted so as not to unnecessarily obscure the invention in detail. The terms software and program code are used interchangeably throughout this application and can refer to logic executed by both hardware and software. Additionally, items denoted as processors may include hardware and/or software processors or other processing circuitry, including but not limited to software defined and/or custom hardware.

Embodiments of the present invention include a computer-implemented method, a computer program product, and a system that includes program code executed by at least one processing resource that: 1) utilizes distributed beamforming (DBF) from a collaborating group of transmitter devices to extend the range of transmission relative to the range of any single transmitter device in the group, and/or 2) utilizes the collaborating group to reduce the required power to close a communication link with a receiver relative to the required power of any single transmitter device in the group to close the same communication link.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Distributed beamforming (DBF) is a form of cooperative communication whereby two or more sources (devices) organize as a collaborative cluster (or group) and focus their transmission in the direction of the intended receiver to achieve orders of magnitude improvements in energy efficiency. By operating as a collaborative cluster, a DBF system not only extends range (over what can be achieved by a single source), but can also reduce interference introduced into co-channel links and limit detectability by a potential adversary. In DBF, data to be transmitted is distributed from a data source to each of the collaborating devices, which in turn, emit a waveform, $s_T(t)$, synchronously and with proper phase alignment (typically obtained via feedback of Channel State Information, or CSI from the receiver) so that the signals combine coherently (e.g., substantially synchronously and in phase) at the intended receiver. If all devices in the group are limited to fixed total average transmit power, through DBF (coherent transmission) with N devices, the group can achieve the same range as a single device with up to $N^2$ times as much power as the maximum per device. Alternatively, at a fixed range, in going from one device to coherent transmission from a group, the group can close the link on aggregate power with as little as $1/N^{th}$ of the power needed by a single device.

A DBF system in accordance with aspects herein applies to a broad range of waveforms, including but not limited to Long-Term Evolution (LTE) systems having 4G and 5G waveforms or tactical systems for military applications. Unique aspects of the invention include:

(1) A flexible DBF architecture with at least two embodiments: an LTE-DBF system (or LTE-DBF appliqué) and a digital-interface integrated-modem DBF system (or IM-DBF system). The LTE DBF appliqué interfaces with the analog output of the LTE user equipment (UE), such as a cell phone, after an LTE waveform has been generated. The IM DBF system interfaces with the digital data of a UE device prior to the formation of the LTE waveform, and wherein the UE device does not have to be an LTE UE. The architecture is applicable to a variety of waveforms including TDD (time division duplex) and FDD (frequency division duplex) variants using relatively fixed channel access (e.g. time division multiple access or TDMA) and flexible channel access (e.g. Request to Send/Clear to Send or RTS-CTS);

(2) A wideband beamforming scheme that maintains the benefits of DBF when operating with instantaneous bandwidths that are large relative to the channel coherence bandwidth;

(3) An approach that efficiently uses the intra-cluster network; and (4) Seamless interworking with other DBF-related technology and advances, not claimed herein, which allows the system to leverage the advantages of these techniques as well; such as: (i) integral spreading techniques (e.g., direct sequences, frequency hopping) which further reduce detectability and vulnerability to jamming, interception and geolocation; and (ii) the Virtualized User Node concept which virtualizes device modems across the cluster and has benefits ranging from protection from data distribution errors in the intra-cluster network to formalizing interaction with RTS-CTS channel access schemes.

The system is well-suited for operation in congested and/or contested RF environments where minimizing the exposure of the device to detection, localization, or exploitation by an adversary is critical. It is also valuable in environments such as low power sensor networks where the ability to communicate at very low aggregate power to preserve/extend battery life is important. DBF can enable clusters of handsets, which would otherwise be unable to connect to a base station, to act collaboratively to complete a link, a capability that can potentially enable first responders to maintain connectivity when fixed communication infrastructure is compromised.

In the sections that follow the invention will be describe in the context of LTE waveforms. This is done for convenience and ease of exposition. The invention, as noted above, is waveform independent and may be utilized in several different wireless and telecommunications standards, such as LTE 3G, 4G and 5G, Wi-Fi 802.11ac, WiMax, satellite and others.

DBF Methods and Devices Generally

The following FIGS. 1-6 and the following disclosure associated with those figures depict aspects in accordance with the present invention, regarding DBF methods and devices of transmitting distributed data generally.

Referring to FIG. 1, a typical program code implemented LTE waveform structure 100 is depicted in accordance with the present invention. The waveform structure 100 is operable to transmit date from user equipment (UE) 102 (such as a cell phone, or lap top computer) to a receiver 104 (such as, for example, a base station (such as an Evolved Node B or ENode B), a cell phone tower, a tactical headquarters or an airplane in flight). The waveform structure may be utilized in both uplink (from UE to receiver) and downlink (from receiver to UE) signal transmissions and may transfer data via both frequency division duplex (FDD) and time division duplex (TDD) techniques.

The waveform 100 adheres to the detailed LTE protocols and specifications utilized worldwide by industry. This includes, but is not limited to, Orthogonal Frequency Division Multiple Access (OFDMA) transmission, Mobility Management Entity (MME), Serving Gateway (SGW), Packet Data Network Gateway (PDN GW) and Multiple Input Multiple Output (MIMO) technology.

The LTE waveform is transmitted in frames 106 of 10 milliseconds (ms) each. Each frame includes ten subframes 108 of 1 ms each. Each subframe 108 includes two time slots 110 of 0.5 ms each. Each time slot typically includes seven OFDM symbols 112.

The each OFDM symbol may include the maximum number of data bits that may be transmitted in parallel along a channel between the UE and the receiver. A channel herein has a predetermined coherence frequency bandwidth that the LTE waveform 100 transmits through from transmission at the transmitter device to reception at the receiver. The channel may extend through a number of analog and radio frequency circuits and antennas that could introduce unwanted coupling and/or distortion into the waveform 100.

Each unique pattern of data bits may be modulated by system software into a unique waveform that can be demodulated by software at the receiver in an uplink data signal transmission and at the UE in a downlink signal transmission. The symbols are transmitted sequentially in time and have a symbol period of about 0.07 ms. Each trailing end of the symbols also include a guard band, called a cyclic prefix 114, that is used to prevent intra symbol interference.

In an OFDM system, the symbols are separated by sub-channels that have overlapping frequency bands. However the program code of the OFDM system phases the frequency bands apart such that they add together orthogonally. In other words, the frequency bands are phased apart such that when one symbol frequency band is at its peak amplitude, the remaining symbol frequency bands will be at zero or near zero amplitude. Accordingly, each symbol in a time slot is transmitted without interference from the other symbols in the same time slot, even if there frequency bands overlap, by virtue of their orthogonal phasing relative to each other.

Figure 2:
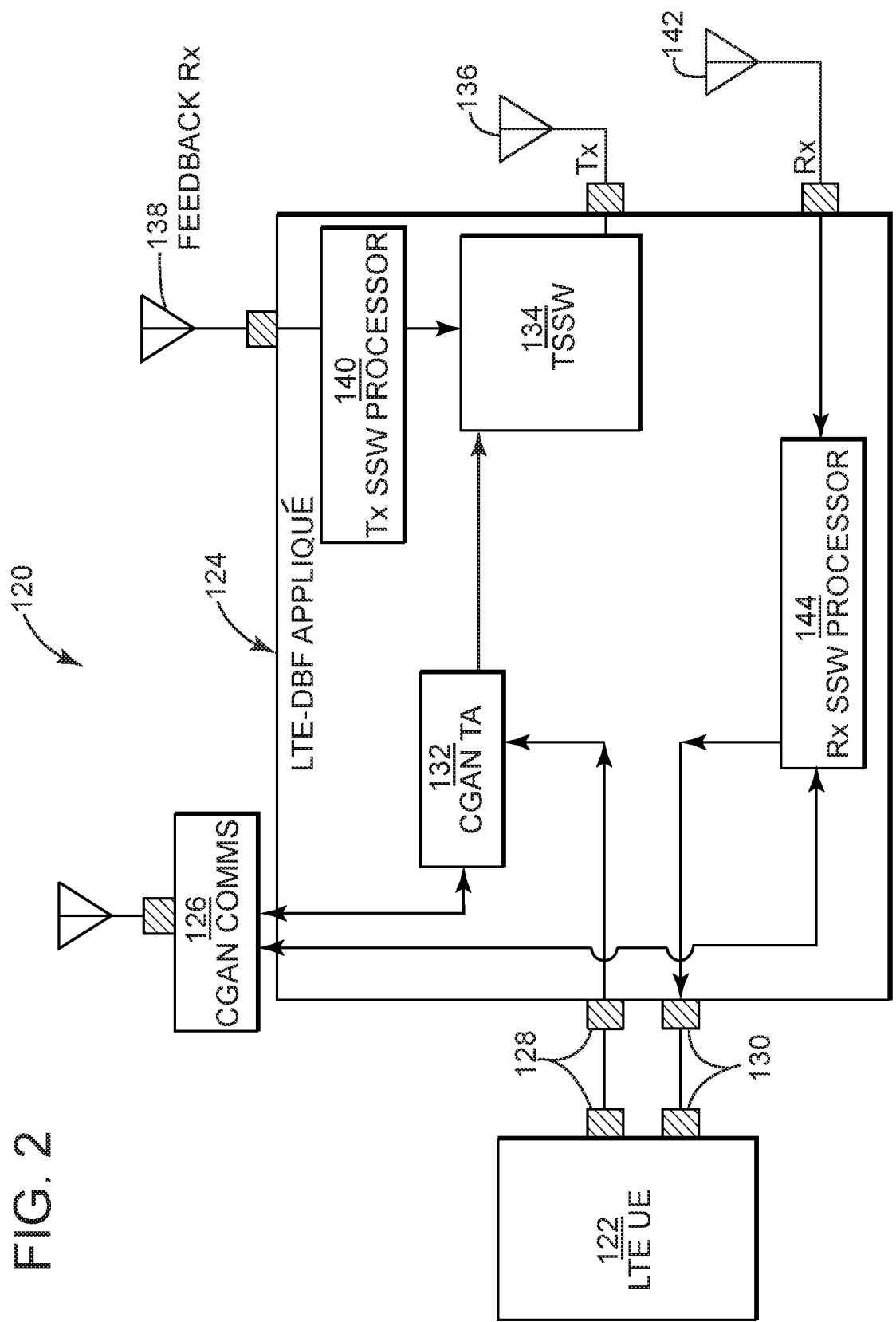
FIG. 2 depicts a simplified block diagram of an embodiment of a collaborating transmitter device with an LTE-DBF Appliqué type DBF signal processing system in accordance with aspects of the present invention.

Referring to FIG. 2, a simplified block diagram of an embodiment of collaborating transmitter device 120 is depicted in accordance with the present invention. The transmitter device 120 includes an LTE user equipment (UE) device 122 (a type of UE device), a DBF signal processing system 124 and a collaborating group area network communications device (CGAN Comms) 126. The DBF signal processing system 124, in this particular exemplary embodiment, is an LTE DBF appliqué 124.

The collaborating transmitter device 120 comprises one transmitter device (also referred to herein as a "node") of a collaborating group of N number of transmitter devices 120. The transmitter devices 120 may, or may not, all be the same device and may, or may not, transmit at the same maximum average power.

The transmitter devices 120 may be a heterogeneous mix of transmitter devices or may be homogeneous. The transmitter devices may all be LTE handsets, or may include other types of transmitter devices like a tactical radio. However, as will be discussed in detail, the collaborating transmitter devices distribute data from a data source to the N number of transmitting devices to assist in the transmission of the data to a receiver.

The data source may be one of the N number of transmitter devices 120 or may be several of the N number of transmitter devices. For example, in the case of a tactical radio system, it could be that a commander has one radio designated as the data source and, therefore, his radio is the only one that is intended to talk back to headquarters (i.e., the receiver). The other nodes may be local radios that the other members of his squad (or collaborating group) have for local communication as collaborating devices, but are not meant to communicate directly with headquarters.

On the other hand, the nodes of the collaborating group may all be similar LTE cell phones. Wherein, in some cases, a first cell phone could be the data source, and in other cases, a second cell phone may function as the data source. There can potentially be any number of multiple data sources in the collaborating group.

The LTE DBF appliqué 124 interfaces with the analog output of the LTE UE 122 device, after the data to be transmitted has been modulated into an LTE waveform/signal internally in the LTE UE 122 and is about to be transmitted to a receiver. The LTE DBF appliqué 124 may be physically configured as a sleeve or case that fits over the LTE UE 122.

There are two parts to the interface between the LTE UE 122 and the LTE DBF appliqué 124. There are the transmit ports 128 for transmitting an uplink LTE waveform/signal 100 and the receive ports 130 for receiving a downlink LTE waveform/signal 100. For purposes of clarity, the transmit ports 128 and receive ports 130 are illustrated as two distinct sets of connectors in FIG. 2. However, the transmit ports 128 and the receive ports 130 may be combined into a single connector, or may be available internally within the LTE UE. Moreover, the transmit ports 128 and receive ports 130 may be on the same pin of a connector, with added circuitry (such as a diplexer) that separates the transmit signals and receive signals.

From the transmit port 128, the uplink data signal enters the LTE DBF 124 and is transmitted to the CGAN Comms 126 through the collaborative group area network time alignment sub-system (CGAN TA) 132. The CGAN TA 132 is used primarily for time alignment of the signals from the collaborative group at the frame level 106 of the waveform 100. That is, program code associated with CGAN TA 132 coordinates transmission of all the nodes (or transmitter devices) in the collaborative group such that they transmit the same frame of the LTE waveform 100 at the same time through their uplink signal transmitter antennas (Tx) 136.

The CGAN Comms 126 functions as a radio, which connects the transmitter device 120 to the other nodes in the collaborating group. In this example, the transmitter device 120 of FIG. 2 is functioning as the data source. The CGAN Comms 126 connects and distributes the data from the data source to the other transmitter devices 120 in the collaborating group. The transmission to the other nodes may be done, for example, on a frame by frame basis, such that all the nodes in the collaborative group have the same copy of the signal that is intended to be transmitted by virtue of the transmitted data being shared over the CGAN Comms.

The uplink data signal is transmitted from the CGAN TA to the training and spatial-spectral weight sub-system (TSSW) 134. At the TSSW 134, program code associated with the TSSW 134 applies a training (or reference) signal and a spatial spectral weight (SSW) to the uplink data signal.

The training signal is used to obtain channel state information (CSI) about the channel that the uplink data signal will travel through to reach the receiver. Each channel that each transmitter device in the collaborative group transmits through, will distort the transmitted signals prior to reaching the receiver. Examples of such distortions include amplitude attenuation, phase shifting, added noise and/or Doppler shifts. The training signal may be a predetermined known signal added to the uplink data signal. When the receiver receives training signal distorted by the channel, program code associated with the receiver can compare the distorted training signal to the initial known training signal to estimate the channel state information (CSI), which, among other things, will provide information on the type and magnitude of the distortions in the channel. Essentially, it will estimate the transfer function of the channel.

The training signal is generally small relative to the uplink data signal (for example, about an order of magnitude smaller in amplitude) so that it does not significantly interfere with the LTE uplink data signal. The training signal may be, for example, an impulse signal or a series of impulse signals.

Once the CSI is estimated at the receiver, program code associated with the receiver may then transmit a CSI signal containing the modulated CSI data back to the transmitter device 120, where it is received at the feedback receiver antenna (Feedback Rx) 138. Once received at the Feedback Rx 138, the CSI signal is processed by software associated with the transmitter SSW processor (Tx SSW processor) 140 to demodulate the CSI data and to use the CSI to determine the spatial spectral weight (SSW) that is to be applied to the uplink data signal at the TSSW 134.

Often CSI in prior art transmitter devices is used to facilitate demodulation of a downlink signal received by the prior art transmitter device from a receiver. However, advantageously and in accordance with the present invention, the CSI is used herein to determine a SSW, or SSW filter, to be applied to each uplink data signal (also referred to herein as "contributing data signals") of each of the N number of transmitter devices in the collaborative group. The SSW filters are operable to adjust at least phase and amplitude of the contributing data signals such that they are received by the receiver substantially synchronously and in substantial phase alignment. Under these conditions, the contributing data signals will coherently combine to form a coherently combined data signal at the receiver.

The contributing data signals synchronously arriving at the receiver may include for example, all of the contributing data signals arriving at the receiver with a range of plus or minus D/2 seconds, where D is small relative to the inverse of the signal bandwidth. For example D may be 20 percent (%) or less, 15% or less, or 10% or less than the inverse of the signal bandwidth. For example for a signal with a 1 MHz bandwidth, D should be small (for example, 10% or less) relative to 1e-6 seconds (i.e., 0.000001 seconds) and therefore the contributing data signals should arrive at the receiver within a range of plus or minus 0.05e-6 (i.e., D/2) seconds or less (i.e., 0.0000005 seconds or less). The contributing data signals arriving in phase alignment at the receiver may include, for example, all of the contributing data signals aligned in phase at the receiver within a range of plus or minus 20 degrees or less, 10 degrees or less, or 5 degrees or less.

Advantageously, the coherently combined data signal will have a maximum coherently combined power at the receiver that is at least greater than the power that would have been received at the receiver of a data signal from a single transmitter device if that single transmitter device were operating at the sum total of the maximum transmit power of each transmitter device in the collaborating group.

Moreover, the maximum coherently combined power can approach N times that sum total. For example, the maximum coherently combined power can be greater than 50%, 75%, 80% or 90% of N times the sum total. This increase in power at the receiver significantly extends the range that any one transmitter device in the collaborating group can transmit.

If the transmitter devices in the collaborating group were all transmitting at the same maximum transmit power, then the maximum coherently combined power can approach N squared times the maximum transmit power of any single transmitter device. For example, the maximum coherently combined power can be greater than 50%, 75%, 80% or 90% of N squared times the maximum transmit power of a single transmitter device.

The terms such as "power", "transmit power" and "maximum power" when used herein refer to the average power that is transmitted by a transmitter device or receiver. The average power (typically in watts) is the average energy transmitted (typically in joules) per unit of time (typically in seconds) during the time period of the transmission.

Additionally advantageously, when the data signals coherently combine at the receiver, the sum total of the transmit power of each transmitter device required to close the link to the receiver at a fixed transmission range is less than the power required to close the link of any single transmitter device in the collaborating group. Moreover, the sum total of the transmit power may approach the power required to close the link of a single transmitter device divided by N. For example, if the N number of transmitter devices in the collaborating group were 3 or greater, then the sum total transmit power may be less than or equal to 75%, 50%, or 40% of the required power of any single transmitter device. This reduction in power to achieve a given range of transmission reduces the amount of power required by any single transmitter device in the collaborating group and further reduces the detectability of the transmitter devices in a tactical situation.

Downlink data signals from the receiver may be received at the downlink signal receiver antenna (Rx) 142. However, because the range of transmission has been extended by the collaborative group on the uplink signal, it is potentially possible that the range has been extended beyond that of the receiver's capability to transmit solely to any one transmitter device in the collaborative group. For that reason, the range may be extended for the downlink signal by utilizing the receiver SSW processor (Rx SSW processor) 144.

The Rx SSW processor 144 receives the downlink data signal that was transmitted from the receiver to the Rx 142. The Rx SSW 144 also pulls in the downlink signals from the other nodes in the collaborative group through the CGAN comms 126. A downlink spatial spectral weight (DSSW) filter may be determined for each transmitter device based on the CSI either at the individual nodes or collectively at the Rx SSW 144.

The DSSW filter associated with each transmitter device may then be applied to each downlink data signal received at the associated transmitter device. The downlink data signals may then be coherently combined at the Rx SSW processor 144 such that a coherently combined downlink data signal is formed. The coherently combined downlink data signal may then be transmitted to the LTE-UE 122.

An advantage of the LTE DBF appliqué 124 is that it interfaces with the analog output of the LTE user equipment (UE), such as a cell phone, after an LTE waveform has been generated. So the LTE DBF appliqué 124 can, for example, attach to an existing cell phone without modifying the cell phone's normal output. The appliqué 124 can convert the cell phone into a transmitter device 120 of a collaborating group by distributing and sharing the output of the cell phone with other nodes and applying a spatial spectral weight (SSW) to the LTE waveform generated at the cell phones analog output.

However, the CGAN comms 126 of the appliqué 124 must have a bandwidth that is much larger than the bandwidth of the channel and must be fast relative to the rate of data transmission of the LTE UE 122. This is because, there are strict timing requirements in the transmission of LTE waveforms, which can tolerate very little delay time being introduced into the LTE waveform by the appliqué 124.

Generally, only a fraction of a symbol period (about 0.07 ms) may be introduced as a delay into the LTE waveform or the transmission will fall out of the required LTE specifications. So from the time the LTE waveform is formed at the analog interface 128 of the LTE-UE 122 to the point where the waveform gets transmitted from the Tx 136, the appliqué has to distribute the data signal to the other nodes of the collaborating group through the CGAN comms 126, and apply the SSW to the signal at the TSSW 134. By way of example, for a data rate of 1 Mbs generated by the LTE-UE 122, the CGAN comms 126 will require a transmission rate of about 40-160 Mbs.

Figure 3:
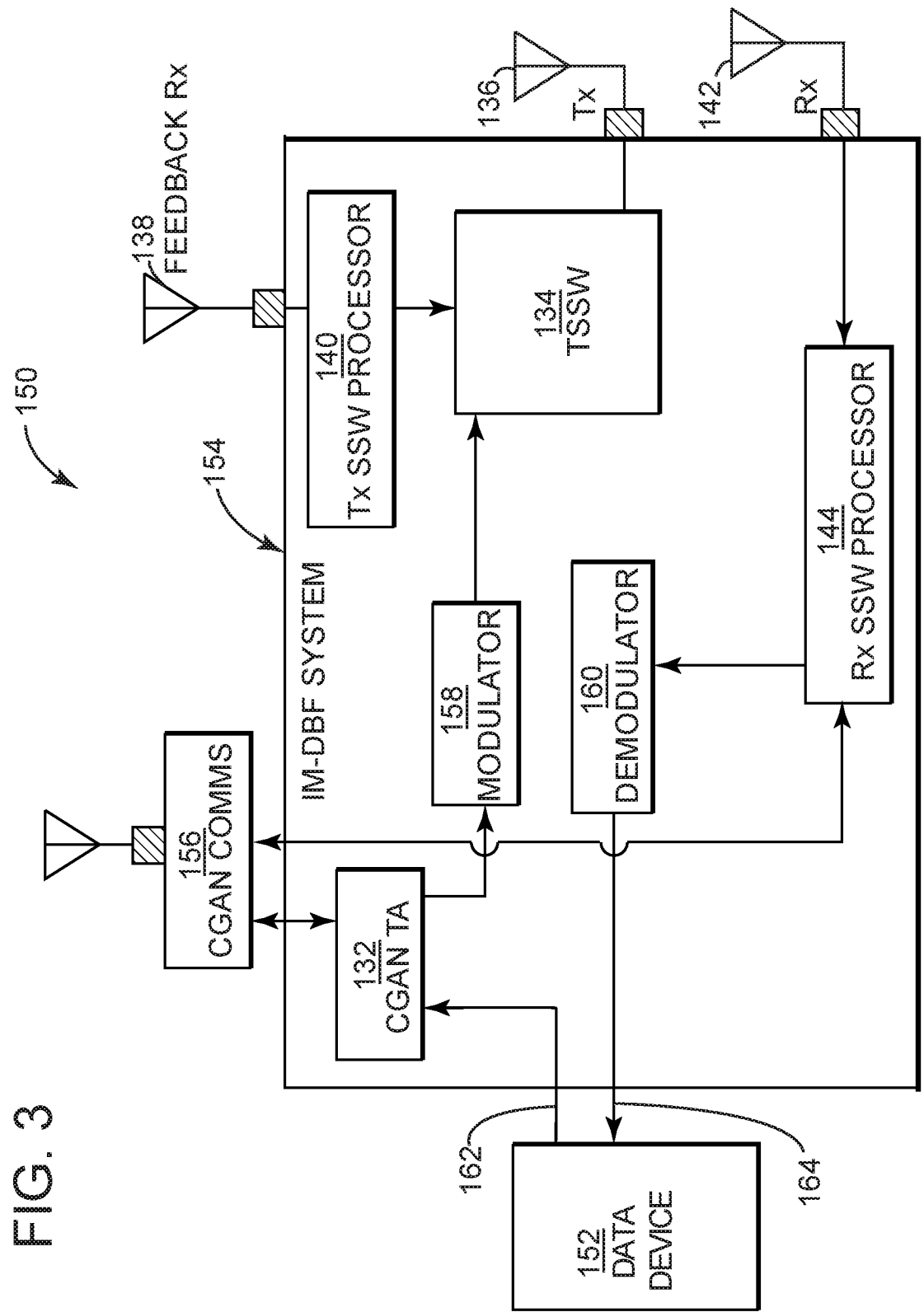
FIG. 3 depicts a simplified block diagram of another embodiment of a collaborating transmitter device with an IM-DBF type signal processing system in accordance with aspects of the present invention.

Referring to FIG. 3, a simplified block diagram of another embodiment of a collaborating transmitter device 150 is depicted in accordance with the present invention. The transmitter device 150 includes a UE device 152, a DBF signal processing system 154 and a collaborating group area network communications device (CGAN Comms) 156. The DBF signal processing system 154, in this exemplary embodiment, is a digital-interface integrated-modem DBF system (IM-DBF system) 154.

Unlike the transmitter device 120, the IM-DBF system 154 of transmitter device 150 interfaces with the raw digital data transmitting from UE device 152 over a digital transmitter interface 162 and interfaces with the raw digital data received from the receiver over a digital receiver interface 164. The transmitter and receiver interfaces 162, 164, may be for example, a data connector on the UE device 152.

Because the digital transmitter interface 162 transmits the data into the IM-DBF system 154 prior to the formation of the LTE waveform, the UE device 152 is not required to be (but may be) an LTE UE device and does not have to generate an LTE waveform at its analog output. Rather, a modulator 158 receives the data from the transmitter interface 162 and forms the LTE waveform to be transmitted within the IM-DBF system 154. Further a demodulator 160 demodulates the LTE waveform received from a receiver within the IM-DBF system 154. The other sub-systems within the IM-DBF system 154 (i.e., the CGAN-Tx 132, the TSSW 134, the Tx, 136, the Feedback Rx 138, the Tx SSW processor 140, the Rx 142 and the Rx SSW processor 144) are all substantially equivalent in function to the sub-systems in FIG. 2 having the same reference numbers.

Because the signal data from the UE device 152 is distributed to the other transmitter devices 150 in the collaborating group prior to formation of the LTE waveform by the modulator 158, the CGAN comms 156 does not have to be appreciably faster than the data rate generated at the UE device 152. For example, for a data rate of 1 Mbs generated by the UE device 152, the CGAN comms 156 will only require a transmission rate of about 1-10 Mbs (as compared to a required transmission rate of 40-160 Mbs from the CGAN comms 126 to support the same data rate generated at the LTE-UE 122 of FIG. 2).

Moreover, by generating the LTE waveform at modulator 158 after the data signals are shared with the other nodes in the collaborating group, the transmitter device 154 of FIG. 3 can support a larger collaborating group than the transmitter device of FIG. 2 without the requirements on the CGAN comms 156 becoming commercially unfeasible. For example, transmitter devices 154 may form collaborating groups of 6, 8 or more, while transmitter devices 122 may form collaborating groups of 2 to 5.

Further, the transmitter device 122 can support time domain distributed beamforming (TD-DBF) and single tap distributed beamforming (ST-DBF), whereas the transmitter UE device 152 can support TD-DBF, ST-DBF and frequency domain distributed beamforming (FD-DBF). This is because, in order to apply a FD-DBF scheme, a discrete Fourier transform (DFT) may be performed on an entire ODFM symbol 112 (see FIG. 1) and then an SSW may be added to it. This operation may necessitate a delay of greater than one symbol period, which may be too long a delay for LTE waveform specifications.

Referring to FIG. 4A, a simplified block diagram of an exemplary embodiment of a FD-DBF algorithm is depicted in accordance with the present invention. The algorithm may be performed by software associated with the Tx SSW processor 140 of transmitter device 150 (see FIG. 3).

At block 170, in the particular modulation and coding scheme of this example, the system software performs a discrete Fourier transform (FFT) on 11 of the 14 symbols 112 of a subframe 108 of an LTE waveform 100 (see FIG. 1). In this case, it is a 72 point DFT to get the frequency representation of the LTE waveform broken up into 72 frequency components per symbol. However there are a variety of modulation and coding schemes that may be utilized and a 72 point DFT is only one such example.

At block 172, two demodulation reference symbols (DMRS) and one sounding reference signal (SRS) may be inserted in the remaining 3 of the 14 symbols of the subframe. The DMRS and SRS are be used to estimate the effective uplink channel as observed at the eNodeB receiver.

At block 174, the spatial spectral weights (SSW) are obtained from the Tx SSW processor 140 and at block 176 the SSW are applied to all 14 symbols. The SSW are also represented by a set of 72 frequency components, which represent amplitude and phase shift based on the CSI transmitted from the receiver to the feedback Rx 138 of the transmitter device 150 (see FIG. 3). Each SSW frequency component in the set is associated with one of the 72 DFT frequency components per symbol. The amplitude and phase of the SSW frequency components may differ from one frequency component to the next. However the same set of SSW frequency components remains constant for each of the 14 symbols in the subframe.

However, the set of SSW frequency components may change from subframe to subframe, depending on changes that occur in the channel. For example, the transmitter devices may be in a mobile vehicle or in an aircraft, so the distance between the transmitter devices and the receiver may change during transmission. As the distance changes, so will the channel state information (CSI) and the associated spatial-spectral weights change. In this example, the SSW are adjusted every subframe, however the SSW may be adjusted more frequently or less frequently depending of such factors as desired signal quality and cost.

At block 178, pulse shaping is applied to the frequency representation of the symbols. The purpose of the pulse shaping is to make the transmitted signal better suited for transmission through the communication channel. Typically this may be done by limiting the effective bandwidth of the transmitted signal. Thereafter, an inverse discrete Fourier transform (IDFT) is performed on each symbol to convert the 72 point frequency representation of each symbol back into the time domain.

At block 180, a cyclic prefix is added between each symbol. At block 182, the training signal is inserted (typically as an overlay on the LTE waveform) and the subframe is transmitted through the channel to the receiver.

Referring to FIG. 4B, a simplified block diagram of an exemplary embodiment of a TD-DBF algorithm is depicted in accordance with the present invention. The algorithm may be performed by software associated with the Tx SSW processor 140 of transmitter device 120 (see FIG. 2). In this example, rather than apply the SSW in the frequency domain as illustrated in FIG. 4A, the time domain version of the waveform is created first and then the SSW are applied in the time domain.

At block 184, the system software performs a discrete Fourier transform (FFT) on 11 of the 14 symbols 112 of a subframe 108 of the LTE waveform 100 (see FIG. 1). In this example, it is also a 72 point DFT to get the frequency representation of the LTE waveform broken up into 72 frequency components.

At block 186, pulse shaping is then applied to the frequency representation of the symbols. Thereafter, an inverse discrete Fourier transform (IDFT) is performed on each symbol to convert the 72 point frequency representation of each symbol back into the time domain.

At block 188, a cyclic prefix is added between each symbol. At block 190 two demodulation reference symbols (DMRS) and one sounding reference signal (SRS) may be inserted in the remaining 3 of the 14 symbols of the subframe.

At block 192, a time domain version of the spatial spectral weights (SSW) filter is obtained from the Tx SSW processor 140 and at block 194 the SSW are applied to all 14 symbols in the time domain. The SSW filter in the time domain may be a finite impulse response filter, which represents amplitude and phase shift based on the CSI transmitted from the receiver to the feedback Rx 138 of the transmitter device 120 (see FIG. 2). The SSW filter remains constant for each of the 14 symbols in the subframe. However, the SSW filter may change from subframe to subframe, depending on changes that occur in the channel.

At block 196, the training signal is inserted (typically as an overlay on the LTE waveform) and the subframe is transmitted through the channel to the receiver.

Referring to FIG. 5, a flow diagram that illustrates a computer implemented method of transmitting distributed data (such as an LTE waveform as illustrated in FIG. 1) over an uplink channel is depicted in accordance with the present invention. The method focuses on transmitting data in an LTE waveform, such as illustrated in FIG. 1, by utilizing a plurality of transmitter devices (or nodes), such as transmitter devices 120 and 150 of FIGS. 2 and 3 respectively. However, the method is not limited to the examples illustrated in FIGS. 1, 2 and 3 and may utilize any communications waveform and any transmitter devices. For illustrative purposes only, references are made to the elements of FIGS. 1, 2 and 3 in the following discussion of the method.

In accordance with the method, the transmitter devices form a collaborating group of N number of nodes utilized in a beam forming operation. At least one of the transmitter devices operates as the data source, which distributes data to the N number of nodes in the collaborating group. The collaborating group then transmits contributing data signals, representing the data, to a receiver over a channel, such that the contributing data signals combine coherently at the receiver.

At 200, the method begins by distributing data from a data source to N number of collaborating transmitter devices. The N number of transmitter devices being operable to synchronously transmit N number of contributing data signals based on the data to a receiver over a channel. The transmitter devices may be configured as transmitter device 120 of FIG. 2, which includes an LTE-DBF appliqué that interfaces with a fully modulated LTE waveform from an analog output of an LTE UE, such as a cell phone. The transmitter devices may also be configured as transmitter device 150 of FIG. 3, which includes an IM-DBF system that interfaces with a digital output of raw data from a data device, such as a lap top computer. The transmitter device 120, 150 that functions as the data source may distribute the data to the N number of collaborating transmitter devices over a CGAN comm 126, 156.

At 202, the method obtains channel state information (CSI) of the channel between each transmitter device and the receiver. The CSI may be obtained by transmitting a predetermined training signal to the receiver. The receiver may then compare the received training signal (distorted by the channel) to the predetermined training signal (unmodified by the channel) to estimate the CSI. The training signal may be a known series of impulse responses integrated into the LTE waveform by a training and spatial spectral weight subsystem (TSSW) 134. The estimated CSI may then be transmitted from the receiver back to the transmitter device where the CSI may be received at the feedback Rx 138 and processed by the Tx SSW processor 140.

At 204, the method determines a spatial spectral weight (SSW) filter for each transmitter device based on the obtained channel state information. This may be done by the Tx SSW processor 140 in the transmitter device 120, 150.

At 206, the method applies the SSW filter associated with each transmitter device to each contributing data signal transmitted from the associated transmitter device. Each SSW filter is operable to adjust at least a phase and/or an amplitude of the data signal transmitted from the associated transmitter device. This may be done by the TSSW 134 in the transmitter device 120, 150.

At 208, the method transmits through the channel, and to the receiver, the N number of contributing data signals filtered by the SSW filters, such that the contributing data signals are received at the receiver synchronously and in substantial phase alignment. Accordingly the contributing data signals will combine coherently to form a coherently combined data signal. The transmission from the transmitter devices may be from an uplink signal transmitter antenna (Tx) 136.

At 210, the method may operate each transmitter device at a maximum transmit power in order to transmit the contributing data signals over a maximum transmission range. An advantageous characteristic of the coherently combined data signal is that it has a coherently combined power at the receiver that is greater than the power that would have been received at the receiver of a contributing data signal, if that contributing data signal were transmitted from a single transmitter device operating at the sum total of the maximum transmit power of each transmitter device. By increasing the power received at the receiver from the transmitter devices, the range of transmission may be significantly extended.

Moreover, the coherently combined power can be up to N times the sum of the maximum transmit power of each transmitter device. For example, the coherently combined power can be equal to or greater than 50%, 75%, 80% or 90% of N times the sum total.

At 212, the method may operate each transmitter device at a transmit power in order to transmit the contributing data signals over a fixed transmission range. Another advantageous characteristic of the coherently combined data signal is that to complete the link for the coherently combined data signal, the sum total of the transmit power of each transmitter device is less than the required power of any single transmitter device of the N number of transmitter devices to transmit its contributing data signal alone over the same fixed transmission range. In other words, the total combined transmit power of all the transmitter devices required to link a coherently combined data signal to a receiver is less than the power required for any single transmitter device making a single link for the same data signal. By decreasing the power required to link to a receiver, battery life will be extended, interference with other signals within the channel will be reduced and detectability of the transmission from the transmitter devices will be reduced.

Moreover, the sum total of the transmit power of each transmitter device required to link the coherently combined data signal to the receiver can be as little as the power required for a single transmitter device to make the same link divided by N. For example, the sum total of the transmit power of each transmitter device may be less than or equal to 75%, 50% or 40% of the required power of any single transmitter device of the N number of transmitter devices to transmit its contributing data signal alone over the same fixed transmission range.

Referring to FIG. 6, a flow diagram that illustrates a computer implemented method of transmitting distributed data (such as an LTE waveform as illustrated in FIG. 1) over a downlink channel is depicted in accordance with the present invention. This method supplements the method described in FIG. 5, as one example of using the N number of nodes in the collaborating group to coherently combine downlink data signals from the receiver to extend the range of the downlink transmission.

The method focuses on transmitting data in an LTE waveform, such as illustrated in FIG. 1, by utilizing a plurality of transmitter devices (or nodes), such as transmitter devices 120 and 150 of FIGS. 2 and 3 respectively. However, the method is not limited to the examples illustrated in FIGS. 1, 2 and 3 and may utilize any communications waveform and any transmitter devices. For illustrative purposes only, references are made to the elements of FIGS. 1, 2 and 3 in the following discussion of the method.

At 220, the method begins by receiving, at each of the N number of transmitter devices (such as transmitter device 120 of FIG. 2 or transmitter device 150 of FIG. 3), a downlink data signal that was transmitted from the receiver (such as receiver 104 of FIG. 1). Each transmitter device 120, 150 may receive the data signals at their downlink signal receiver antenna (Rx) 142. The signals are then transmitted to the Rx SSW processor 144 in each transmitter device. The Rx SSW processor is in communication with the other nodes of the collaborating group via their CGAN comms (such as CGAN comms 126 of FIG. 2 or CGAN comms 156 of FIG. 3).

At 222, a downlink spatial spectral weight (DSSW) filter is be determined for each transmitter device based on the CSI. The DSSW filter may be determined at the Rx SSW processor 144 of each node 120, 150 in the collaborative group. Alternatively, the DSSW filter for each node may be determined at the Rx SSW processor 144 of the transmitter device that is designated as the data source for the collaborative group.

At 224, the DSSW filter associated with each transmitter device is applied to each downlink data signal received at the associated transmitter device 120, 150. The DSSW filter may be applied at the Rx SSW processor 144 of each node 120, 150 in the collaborative group. Alternatively, the DSSW filter for each node may be applied at the Rx SSW processor 144 of the transmitter device that is designated as the data source for the collaborative group.

At 226, the N number of downlink data signals filtered by the DSSW filters are coherently combined to form a coherently combined downlink data signal at the data source. The DSSW filtered downlink data signals may be coherently combined at the Rx SSW processor 144 of transmitter device that is designated as the data source.

By coherently combining the downlink data signals at the data source, the range of transmission of the downlink signal from the receiver is extended beyond the range that any single transmitter device in the collaborating group would be capable of receiving. In this way, the range of transmission for both the uplink signals and downlink signals may be extended by the collaborating group of transmitter devices.

DBF Methods and Devices with Optional Spreading Techniques

The following FIGS. 7-16 and the following disclosure associated with those figures depict aspects in accordance with the present invention, regarding DBF methods and devices for transmitting distributed data wherein optional spreading techniques may be applied to the data signals. Spreading techniques and methods are often utilized for expanding the bandwidth of signals to lower power spectral density. This is done to lower detectability at a threat receiver (for military applications), or in commercial applications, to manage co-channel interference and to enable multiple users to access a common portion of the radio spectrum.

Spreading techniques are discussed in detail in U.S. patent application Ser. No. 16/579,380, filed on Sep. 23, 2019, to Joseph C. Liberti et al. and titled: Spread Spectrum Signature Reduction, which is incorporated herein in its entirety.

Figure 7:
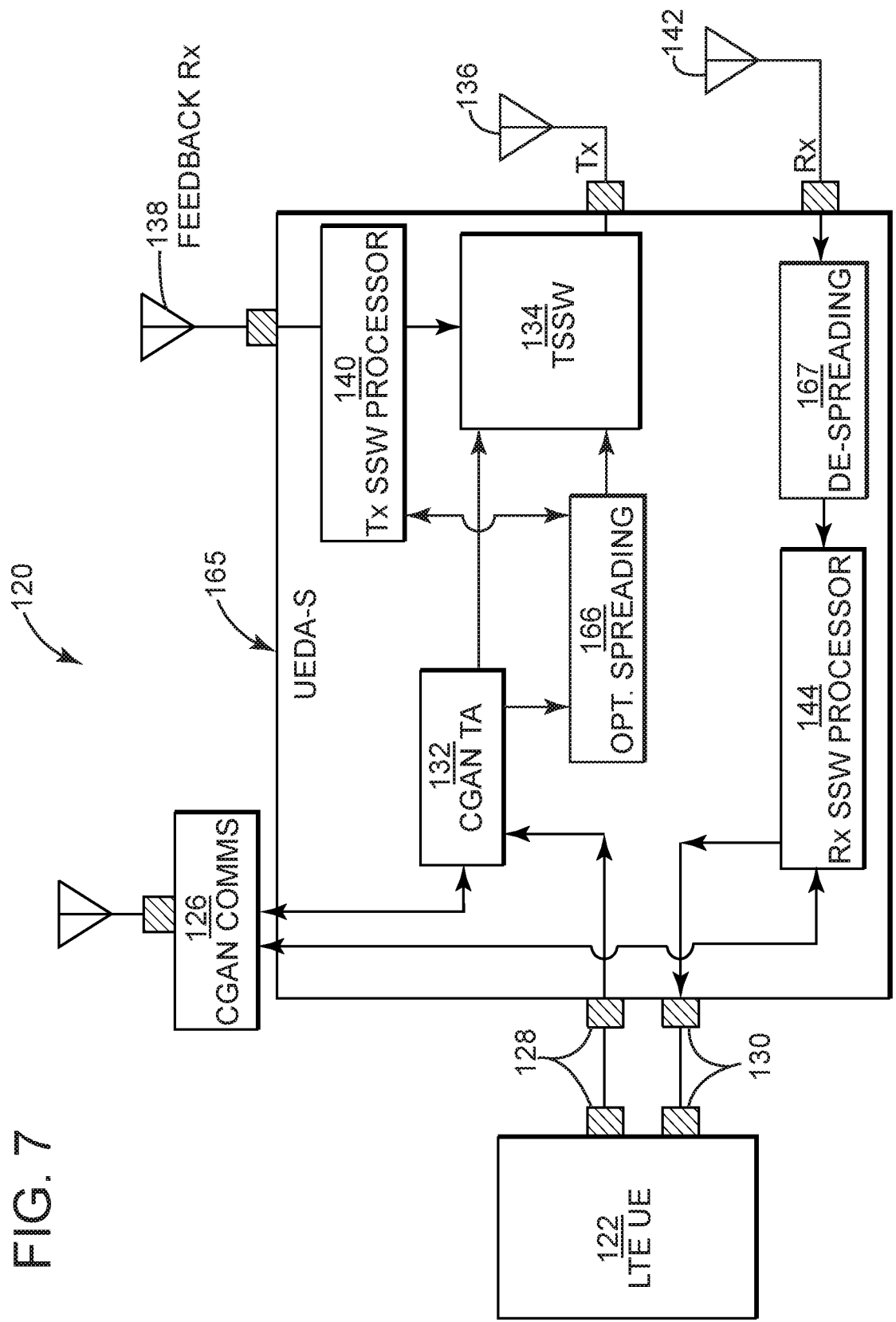
FIG. 7 depicts an example of a block diagram of a UE DBF Appliqué with spreading (UEDA-S) type DBF signal processing system, which uses an analog interface to an LTE handset in according to aspects of the present invention.

Referring to FIG. 7, an example of a block diagram of a UE DBF Appliqué with spreading (UEDA-S) system 165, which uses an analog interface to an LTE UE 122 (such as a cell phone) is depicted, according to aspects of the present invention. The UEDA-S 165 of FIG. 7 is an embodiment of a DBF signal processing system which includes an optional spreading feature. More specifically, uplink data signals may be spread at spreading sub-system 166 prior to being processed by the TSSW 134. Further, downlink data signals may be de-spread at de-spreading sub-system 167 after being received at the downlink signal receiver antenna (Rx) 142. The UEDA-S 165 may be configured as a sleeve, case or attachment that fits over or onto the LTE UE 122.

Spreading is used in the case of tactical LTE, as a means to mitigate the ability of an adversary to intercept or jam the LTE signal. In the spreading process, the waveform is expanded in bandwidth using a spreading sequence with a chip period that is small relative to the LTE sample period. For example, for an LTE waveform using 6 resource blocks, the LTE sample rate is 1.92e6 samples/second and the spreading sequence would have a chip rate that is SF times 1.92e6 samples/sec. As a result, the spread waveform will have a larger bandwidth (by a factor of approximately SF) than the original LTE waveform. The spread waveform will have a lower power spectral density, and will thus be harder for an adversary to detect. At the receiver, a de-spreading block removes the effect of spreading prior to eNodeB signal processing, resulting in a waveform that is in the form that the eNodeB requires.

Figure 8:
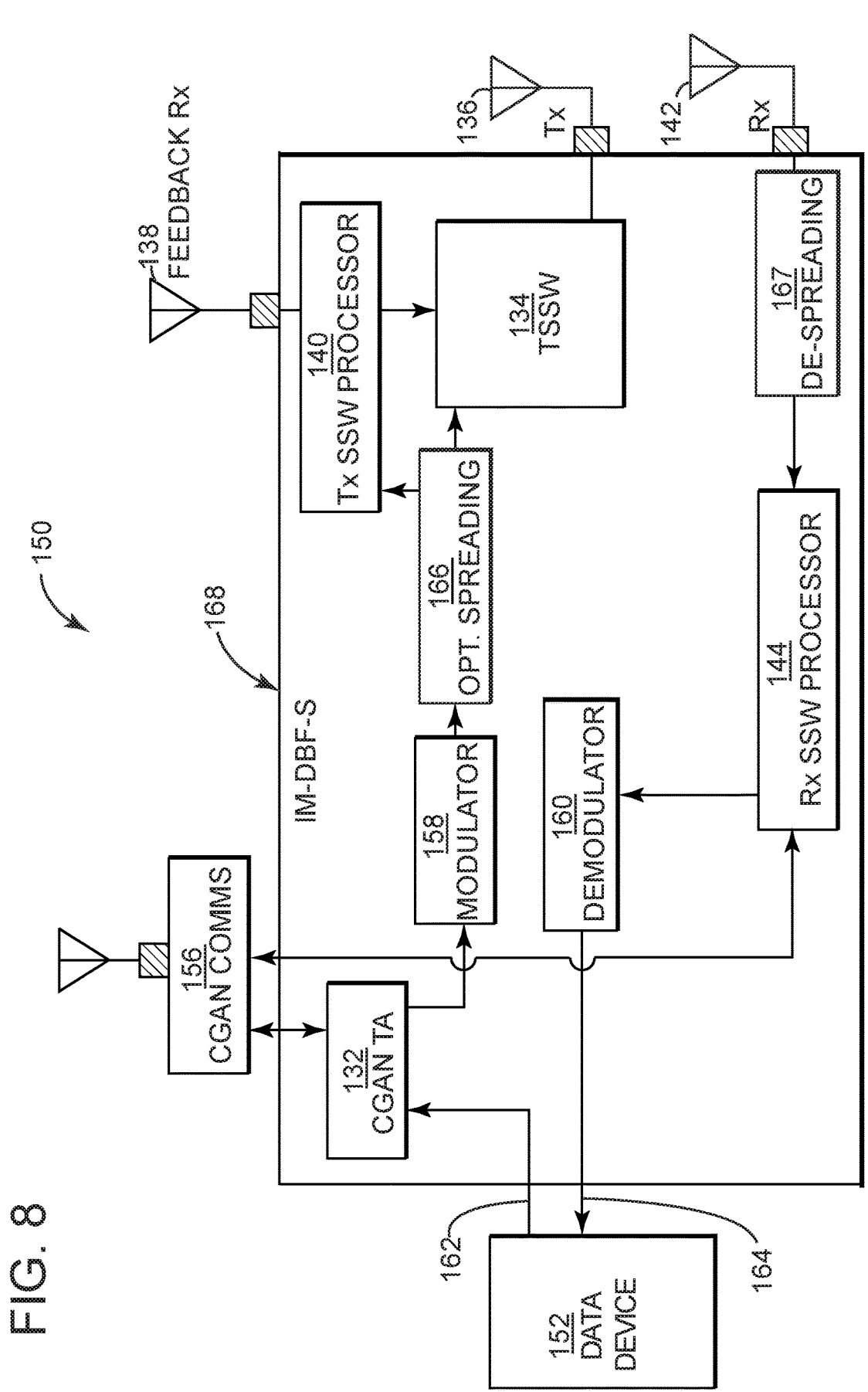
FIG. 8 depicts an example of a block diagram of an integrated-modem DBF with spreading (IM-DBF-S) type DBF signal processing system, which uses a raw data connection to the host data device and includes an optional spreading function in accordance with aspects of the present invention.

Referring to FIG. 8, an example of a block diagram of an integrated-modem DBF with spreading (IM-DBF-S) system 168, which uses a raw data connection to the host UE device 152 (such as a lap top computer) and includes an optional spreading function is depicted, according to aspects of the present invention. The IM-DBF-S system 168 of FIG. 8 is another embodiment of a DBF signal processing system which also includes an optional spreading feature. More specifically, uplink data signals may be spread at block 166 prior to being processed by the TSSW 134. Further, downlink data signals may be de-spread at block 167 after being received at the downlink signal receiver antenna (Rx) 142. The IM-DBF 168 may be configured as a sleeve, case or attachment that fits over or onto the UE device 152.

Block 166 performs the optional spreading process in which the LTE waveform is spread by a spreading sequence with a chip rate that is SF times the LTE sample rate. Block 167 performs the de-spreading function if spreading is applied to the LTE downlink, removing the effect of spreading and leaving a waveform that is in the form required for UE signal processing.

DBF Advantages

In distributed beamforming (DBF), data to be transmitted is distributed from a data source to each of the collaborating nodes, which in turn, emit a waveform, $s_T(t)$, synchronously and with proper phase alignment (typically obtained via feedback of Channel State Information, or CSI from the receiver) so that the signals combine coherently at the intended receiver. For the simple case of additive white Gaussian noise (AWGN) channels between the N transmitting nodes and the receiver, the received signal is $$r_{Tot}(t) = \sum_{n=0}^{N-1} e^{j\phi_n} \sqrt{P_{T,n}} \, h_n \, s_T(t) + n(t) \quad (1)$$

Where the power transmitted from each node is $P_{T,n}$, the complex value representing each channel is $h_n$, and the noise is n(t). More general mobile fading channels with time dispersive multipath are addressed below. If the transmitted power from each node is $P_{T,n}=P_T$, the channels have the same amplitude $|h_{T,n}|=A$, and the phases $\phi_n$, applied at each transmitter, are adjusted for coherence, then power measured at the intended receiver is $P_r=E\{|r_{Tot}(t)|\}=N^2P_TA^2$. By comparison, if a single transmit node had been used, the available received power is $P_TA^2$. For the case of fixed/limited power per transmit node, the potential to achieve an improvement in received power proportional to $N^2$ when using N transmit nodes compared with a single transmitting node is a distinguishing feature of distributed coherence, which can enable a transmitting cluster (a transmitting collaborating group) to achieve significant range extension without increasing the power output of any individual node. Because the signals from the emitters add coherently at the intended receiver, and are unlikely to added coherently at another location, a non-intended receiver will be fundamentally disadvantaged compared with the intended receiver at the same distance from the transmitting group.

Alternatively, at a given range from the intended receiver, a cluster (or group) of N nodes can successfully close the link using an average power per node that is reduced by a factor of $20 \log_{10}N$ dB compared with the single transmit node case, reducing battery drain and further reducing the threat of signal exploitation by an adversary. Together the ability of distributed beamforming to provide range extension, increased battery life, and reduced detectability have major advantages.

Flexible Architecture: Network Appliqué and Modem-Integrated

A DBF approach, in accordance with aspects herein, provides flexible network systems and methods that can enable DBF-enabled transmitter devices to connect to DBF-enabled base stations to deliver resilient communications. FIGS. 7 and 8 illustrate architectures for DBF-enabling signal processing systems in the context of LTE, including both a UEDA-S 165 system approach, as shown in FIG. 7, and an IM-DBF-S 168 system approach, as shown in FIG. 8. The capabilities of each approach are summarized in Table 1.

TABLE 1

Comparison of applique and integrated LTE UE DBF solutions.

| | UE DBF Appliqué with spreading (UEDA-S) FIG. 7 | Integrated-Modem DBF with spreading (IM-DBF-S) FIG. 8 |
|---|---|---|
| Implementation form factor | Sleeve, case, attachment for COTS UE | Sleeve, case, attachment for COTS UE |
| COTS-UE-to-DBF-interface | Analog LTE signals | Digital data |
| DBF Algorithms | TD-DBF or ST-DBF | FD-DBF, TD-DBF, or ST-DBF |
| CGAN (Collaborating Group Area Network) Requirements for User Payload Data Rates up to 1 Mbps | UEDA-S to CGAN (40-160 Mbps/Source) Requires low latency, high rate, custom CGAN | IM-DBF-S to CGAN (Comparable to aggregate payload rate for the CG, on the order of 1-10 Mbps) Can use COTS CGAN supporting appropriate data rate |
| Number of Supported Nodes | Up to four per CG (limited by UEDA-S to CGAN) | Scalable |
| Compatibility with COTS LTE eNodeBs | Uplink DBF interacts with legacy eNodeBs using simple system at the eNodeB as shown in FIG. 7 | |
| DS/FH Spreading | Full support for DS or FH system spreading | |

Both approaches make use of the collaborating group (or intra-cluster) area network of collaborating group nodes, designated as CGAN, which can be implemented either as an external radio or an integral component of the DBF signal processing system. Additionally, both approaches can be realized as several configurations, such as, but not limited to, sleeves, cases or attachments for a data device.

The user equipment (UE) DBF Appliqué with spreading (UEDA-S), shown in FIG. 7, interfaces with an unmodified LTE handset via the analog transmit and receive antenna connectors to give the device the advantages of distributed uplink beamforming for diverse links. In the appliqué approach, the UEDA-S ingests the analog signal generated by the UE and shares it among the other UEDA-Ss in FIG. 7 via the CGAN comms 126. The CGAN comms 126 may be an external device that interfaces to the UEDA-S 165 or may be built into the UEDA-S 165 (or into any other DBF signal processing system).

Each node aggregates the contributions to be transmitted during a symbol-period, and each node applies a spatial-spectral transform using feedback from the receiver so that the signals from each transmit node add coherently at the intended receiver. In the appliqué approach, from the point of view of the UE modem, the CGAN and other nodes in the collaborative group (CG) effectively appear to be part of the radio channel.

For the UEDA-S 165 (as well as for the LTE-DBF Appliqué 124 of FIG. 2), the CGAN data rates required are quite high since collaboration is performed after LTE waveforms are formed at the LTE modem, so the CGAN must convey the encoded and modulated waveforms generated by each LTE UE 122 to the other UEDA-Ss in the CG. In addition, for the LTE uplink, the CGAN function must be included within the latency budget between the waveform generation function and the receiver, which may constrain the MAC (Medium Access Control) design for the CGAN. Similar constraints exist for distributed reception using the CG.

Alternatively, the IM-DBF-S 168 (as well as the IM-DBF 154 of FIG. 3) can be used in which the waveform modem (e.g., the modulator 158 and the demodulator 160) is integrated with the IM-DBF-S 168 as shown in FIG. 8. In this approach, the payload data $d_n$ for each UE is shared within the CG prior to modulation, which avoids the need for CGAN latency to be included in the uplink latency budget. Furthermore, since pre-modulation data is distributed between the nodes, the required CGAN data rate is on the order of the aggregate average user payload data rate for the nodes in the CG. In the IM-DBF-S approach, after aggregating all of the data to be transmitted in a symbol-period, all the UEs in the CG synchronously form a common signal $s_{T,s}$ for each symbol-period. Each node applies a transform to the aggregated signal, $s_{T,s}$, and the signals are then collaboratively transmitted.

While the former case (the UEDA-S 165 of FIG. 7) re-uses commercial off the shelf (COTS) LTE modems present in the UEs, the much higher CGAN data rate required may be impractical for some use cases due to power limitations and detectability concerns. One requirement to the IM-DBF-S 168 approach is the need for an implementation of the LTE modem in the IM-DBF-S 168. Note that the IM-DBF-S system has the added benefit that it is not absolutely necessary to use an LTE-based waveform (even if the data device in FIG. 8 is an LTE device) on the DBF link. There may indeed be compelling use cases in which an LTE-based waveform is not used.

Uplink DBF Operation

Table 2 shows two different approaches for cooperative beamforming to achieve objectives: range extension or minimization of detectability. As discussed earlier, cooperative beamforming can be achieved in the AWGN channel by applying a delay and phase shift at each transmitting node n to the signal to be transmitted, $s_T(t)$, which is refer to herein as Single-Tap-DBF (ST-DBF). Generally, the delay and phase can be determined through feedback of channel state information from the receiver to the transmitter. While the simple delay-and-phase shift approach of ST-DBF may be effective for narrowband signals in benign channels (where the signal bandwidth is small relative to the coherence bandwidth), for time-dispersive multipath channels supporting bandwidths appropriate for data rates in the 300 kbps to 1 Mbps range, ST-DBF may sacrifice a significant part of the potential gain of distributed beamforming.

In a Frequency Domain Distributed Beamforming (FD-DBF) approach, each transmitting node n applies a transfer function corresponding to $\tilde{v}_{n,k}$, which is the complex gain for subcarrier frequency index k. The approach applies equally well to single-carrier waveforms, such as SC-FDMA in LTE, as well as OFDM waveforms, provided that a cyclic prefix (CP) is included. When a CP is not used (or when the signal is covered by a scrambling/spreading sequence), FD-DBF performance can be achieved using multi-tap Time Domain DBF (TD-DBF) as described further in a later section below.

TABLE 2

Power distribution methods for cooperative uplink beamforming, assuming that the transmit power for the single UE case (1-tx) is $P_1$ with receiver signal-to-noise-ratio $SNR_1$ with maximum range $d_1$, assuming path loss exponent α (e.g. α = 4 for plane earth model).

| CBF Approach | Sum of CG Tx Power | SNR at Range[1] $d_N = d_1$ | Range Extension[2] at $SNR_N = SNR_1$ | Detectability[3] |
|---|---|---|---|---|
| Range Extension: Each UE transmits $P_1$ | $N/P_1$ | Using N transmitters, SNR at Rx is $SNR_N = N^2 SNR_1$ | $d_N/d_1 = N^{1/\alpha}$ | Unchanged, on average, from 1-tx |
| Min Power: Each UE transmits $P_1/N^2$ | $P_1/N$ | Using N transmitters, SNR at Rx is $SNR_N = SNR_1$ | $d_N/d_1 = 1$ | Lower by 1/N relative to 1-tx case |

[1]Assumes same propagation conditions across all N transmitters as in the single UE case, and a single data source at a time per CG.
[2]The maximum range $d_N$ at which the required SNR can be met.
[3]Averaged received power at a threat receiver in the case of cooperative beamforming relative to the received power for the 1-tx case for the same range and propagation conditions.

DBF Uplink Signal Processing

Figures 9A, 9B:
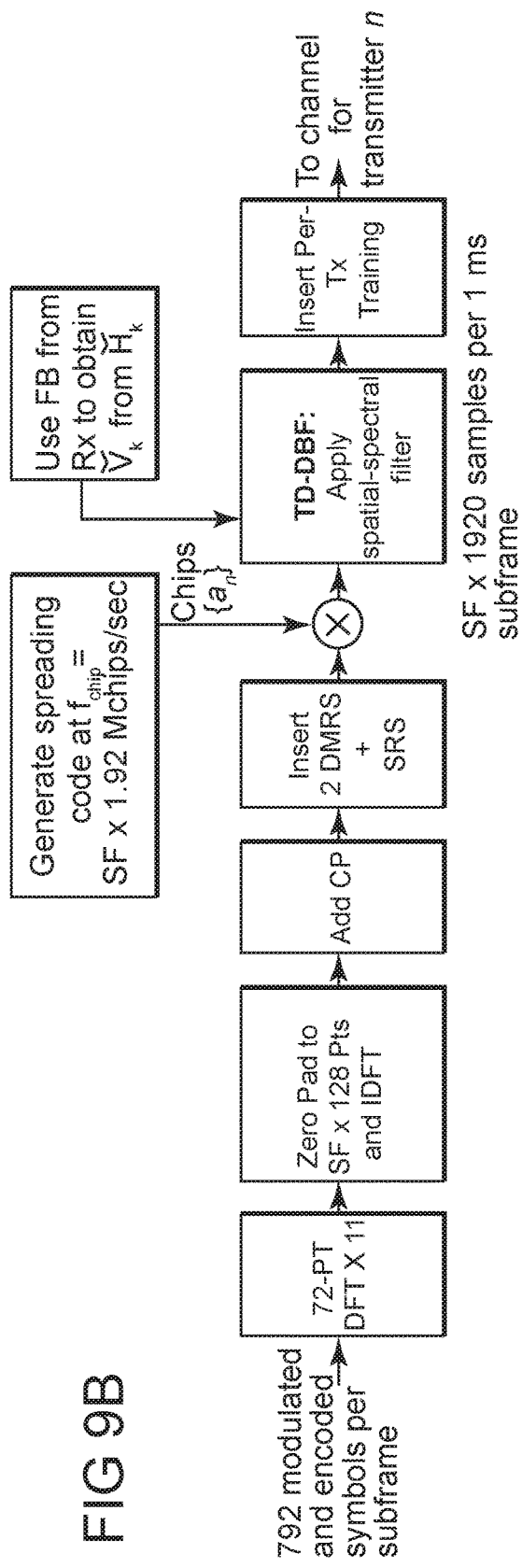
FIG. 9A depicts an example of a block diagram of an FD-DBF transmitter for a node n in accordance with aspects of the present invention.
FIG. 9B depicts an example of a block diagram of a TD-DBF transmitter for a node n in accordance with aspects of the present invention.

Referring to FIGS. 9A and 9B, examples of a block diagram of FD-DBF (FIG. 9A) and TD-DBF (FIG. 9B) transmitters for a node n are depicted, according to aspects of the present invention. Both the TD-DBF and FD-DBF approaches are illustrated in FIGS. 9A and 9B respectively.

In the following discussion, operation for the DBF-enabled LTE uplink is described. However, as noted previously, similar procedures can be applied for other waveforms. For LTE, after the uplink data segments $\{d_n\}$ to be transmitted during a given subframe (a 1 ms interval in LTE) are exchanged over the CGAN, the common aggregated time-domain signal, $s_T$, which can contain contributions from multiple source nodes among the CG, is prepared at each transmitter using the procedure shown in FIGS. 9A and 9B. Each subframe in the LTE uplink is divided into 14 symbol-periods, represented by time series $s_{T,s}$, of length K for s=0, ..., 13. For a DFT (discrete Fourier transform) length of K=128 (used, for example, when 72 subcarriers are occupied in LTE), as in FIGS. 9A and 9B, each symbol-period contains contributions from 72 modulation symbols. After the CPs are added to each symbol-period, and the 14 symbol-periods are appended to one another, the resulting subframe comprises 1920×SF, where SF is the spreading factor, samples for the parameters shown. To support estimation of Channel State Information on a per-transmit-node basis, as discussed in a later section, per-Tx training sequences are embedded in the transmit waveform as shown in FIGS. 9A and 9B. The training sequences are designed to not interfere with the transmitted waveform and to not to increase signal detectability.

For each of the 14 symbols-periods in the subframe, each transmitter applies a transmit filter, which can be represented in the time domain by K×K circulant matrix, $V_n = F^H \tilde{V}_n F$, which has the effect of applying spatial-spectral weight $\tilde{v}_{n,k}$ on subcarrier k. Likewise, $H_{m,n} = F^H \tilde{H}_{m,n} F$, is the K×K circulant representation of the time-dispersive multipath channel between emitter n and aperture m at the receiver. F is $N_s \times N_s$ discrete Fourier transform (DFT) matrix, where element (m,k) is $[F]_{m,k} = \exp(-j2\pi mk/K)/\sqrt{K}$, and $F^H F = FF^H = I$. Because of the circulant property, $\tilde{H}_{m,n} = \text{diag}[\tilde{h}_{m,n,0} \ldots \tilde{h}_{m,n,K-1}]$ and $\tilde{V}_n = \text{diag}[\tilde{v}_{n,0} \ldots \tilde{v}_{n,K-1}]$ where the complex gain of the channel from transmitter n to receiver m on subcarrier k is $\tilde{h}_{m,n,k}$. At the receiver, for each symbol-period, after discarding the CP, the K×1 time domain vector of received samples for symbol-period s can be expressed as:

$$r_{s,m} = \sum_{n=0}^{N-1} H_{m,n} V_n s_{T,s} + n_{s,m} \quad (2)$$

The corresponding K×1 frequency domain representation is $$\tilde{r}_{s,m} = F r_{s,m} = \sum_{n=0}^{N-1} \tilde{H}_{m,n} \tilde{V}_n F s_{T,s} + F n_{s,m} \quad (3)$$

$$= \sum_{n=0}^{N-1} \tilde{H}_{m,n} \tilde{V}_n \tilde{s}_{T,s} + \tilde{n}_{s,m}$$

The elements $\tilde{h}_{m,n,k}$ can be re-organized for subcarrier k into the M×N MIMO channel matrix $\tilde{H}_k$. The transmit beamforming spatial-spectral weights, $\breve{v}_k$, for subcarrier k are obtained from the dominant right singular vector of $\breve{H}_k$ which is the column of $\breve{V}_k$ corresponding to the maximum value of the diagonal of $\breve{S}_k$ in $$\breve{H}_k = \begin{bmatrix} \breve{h}_{0,0,k} & \cdots & \breve{h}_{0,N-1,k} \\ \vdots & \ddots & \vdots \\ \breve{h}_{M-1,0,k} & \cdots & \breve{h}_{M-1,N-1,k} \end{bmatrix} = \breve{U}_k \breve{S}_k \breve{V}_k^H \quad (4)$$

For the case of a single receive antenna, where $\breve{H}_k = \breve{h}_k$ we have $\breve{v}_k^H = \breve{h}_k / \|\breve{h}_k\|$. The receiver provides channel state information, $\{\breve{H}_k\}$, via a feedback channel to the DBF-enabled UE to adjust the weights $\{\tilde{v}_{n,k}\}$ in the case of FD-DBF.

At the receiver, we form the received signal estimate for subcarrier k, for subframe s, $$\tilde{z}_{s,k} = \breve{w}_k \breve{r}_{s,k} \quad (5)$$

The weight vector $\breve{w}_k$ that minimizes Minimum Mean Square Error (MMSE), $J = E\{|\tilde{z}_s - \tilde{s}_{T,s}|^2\} = E\{|z_s - s_{T,s}|^2\}$ between the estimates $z_s = [z_{s,0} \ldots z_{s,K-1}]^T$ and the transmitted signal $s_{T,s} = [s_{T,0} \ldots s_{T,K-1}]^T$ can be calculated using $$\breve{w}_k = (\breve{H}_k \breve{v}_k \breve{v}_k^H P_{S,k} + \breve{g}_k \breve{g}_k^H P_{J,k} + P_{N,k} I)^{-1} \breve{H}_k \breve{v}_k P_{S,k} \quad (6)$$

where $P_{S,k}$ and $P_{N,k}$ are the power levels on subcarrier k corresponding to the signal-of-interest (SOI) and noise. $P_{J,k}$ and $\breve{g}_k$ are the power and spatial signature, respectively, for a jammer for subcarrier k. Thus, the receiver has an estimate, $z_s$, of $S_{T,s}$ for the contents of the transmitted symbol-period, which can be processed to extract the aggregated signal allowing extraction of the corresponding user data $\{d_n\}$ for the subframe. Performance results for FD-DBF and ST-DBF using 8 cooperative transmitters with complex multipath channels are discussed in the next section.

An alternative approach is to implement the spatial-spectral weights by applying a time domain filter (Time Domain Distributed Beamforming, or TD-DBF) as shown in FIG. 9B. TD-DBF is implemented by approximating the per-transmitter frequency response $\{\tilde{v}_{n,k}\}$ with an FIR filter with a limited number of taps.

Figure 10:
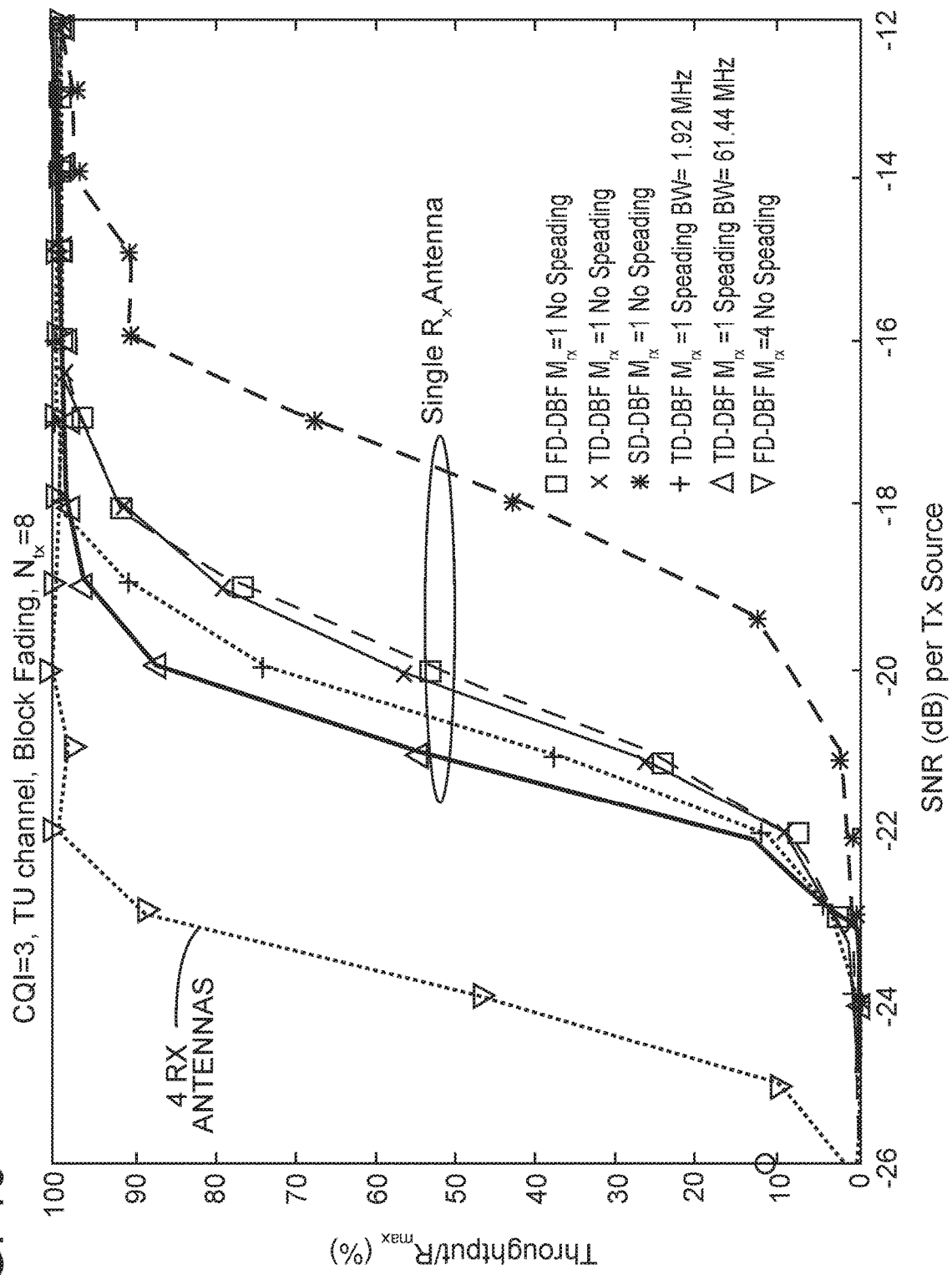
FIG. 10 depicts an example of a comparison of FD-DBF, TD-DBF, and ST-DBF approaches with and without spreading, for N=8 transmit nodes and CQI=3 in accordance with aspects of the present invention.

Referring to FIG. 10, an example of a comparison of FD-DBF, TD-DBF, and ST-DBF approaches with and without spreading, for N=8 transmit nodes and CQI=3 is depicted, according to aspects of the present invention. FIG. 10 shows a comparison of the FD-DBF method and the TD-DBF method using 32 taps, in which case the difference in performance is negligible. TD-DBF is compatible with appliqué spreading of the LTE waveform where a spreading sequence is applied which expands the occupied bandwidth and obscures features such as the cyclic prefix which can be readily detected by a threat interceptor. At the intended eNodeB receiver, the spreading cover is removed (effectively restoring the CP) prior to processing by the COTS eNodeB. The TD-DBF approach thus enables seamless integration of distributed beamforming with spreading technology for a complete, robust physical layer, which retains the key benefits of the underlying COTS LTE technology while providing protection from detection, exploitation, and jamming.

DBF Uplink Performance

Figure 11:
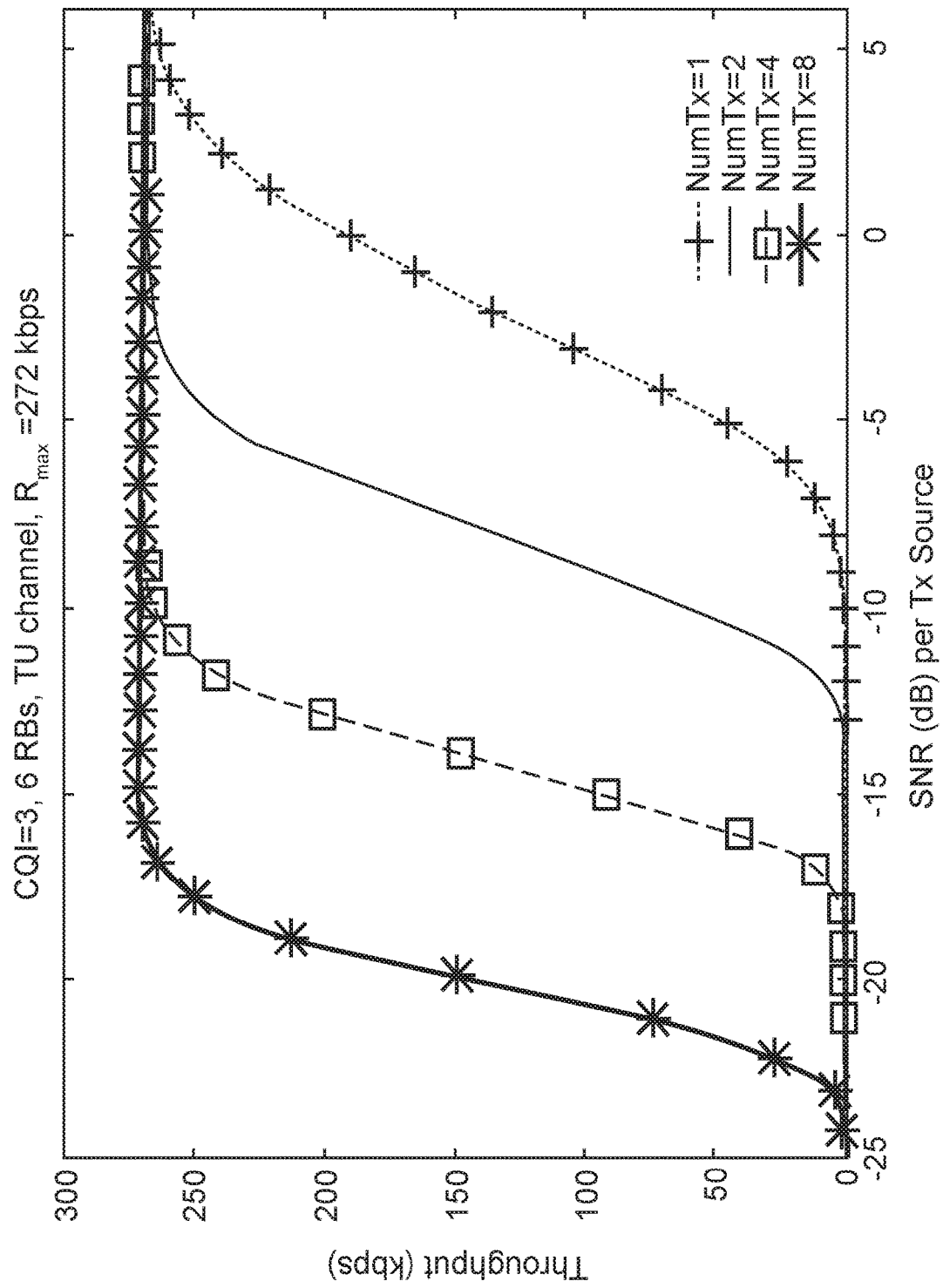
FIG. 11 depicts an example of FD-DBF performance for uplink LTE in a typical urban (TU) channel in accordance with aspects of the present invention.

Referring to FIG. 11, an example of FD-DBF performance for uplink LTE in a typical urban (TU) channel is depicted, according to aspects of the present invention. FIG. 11 shows the performance of the FD-DBF approach for N=1, 2, 4, and 8 transmit nodes for the "typical urban" (TU) channel commonly used for evaluating LTE performance, using a 1.4 MHz LTE uplink signal occupying 72 subcarriers. In FIG. 11, the x-axis represents the average SNR measured at the receiver considering a single transmitter at a time (SNR/Tx). The average SNR/Tx required to achieve 90% of the maximum data rate (272 kbps) improves by approximately $N^2$, as the number of transmitters N increases.

Figure 12:
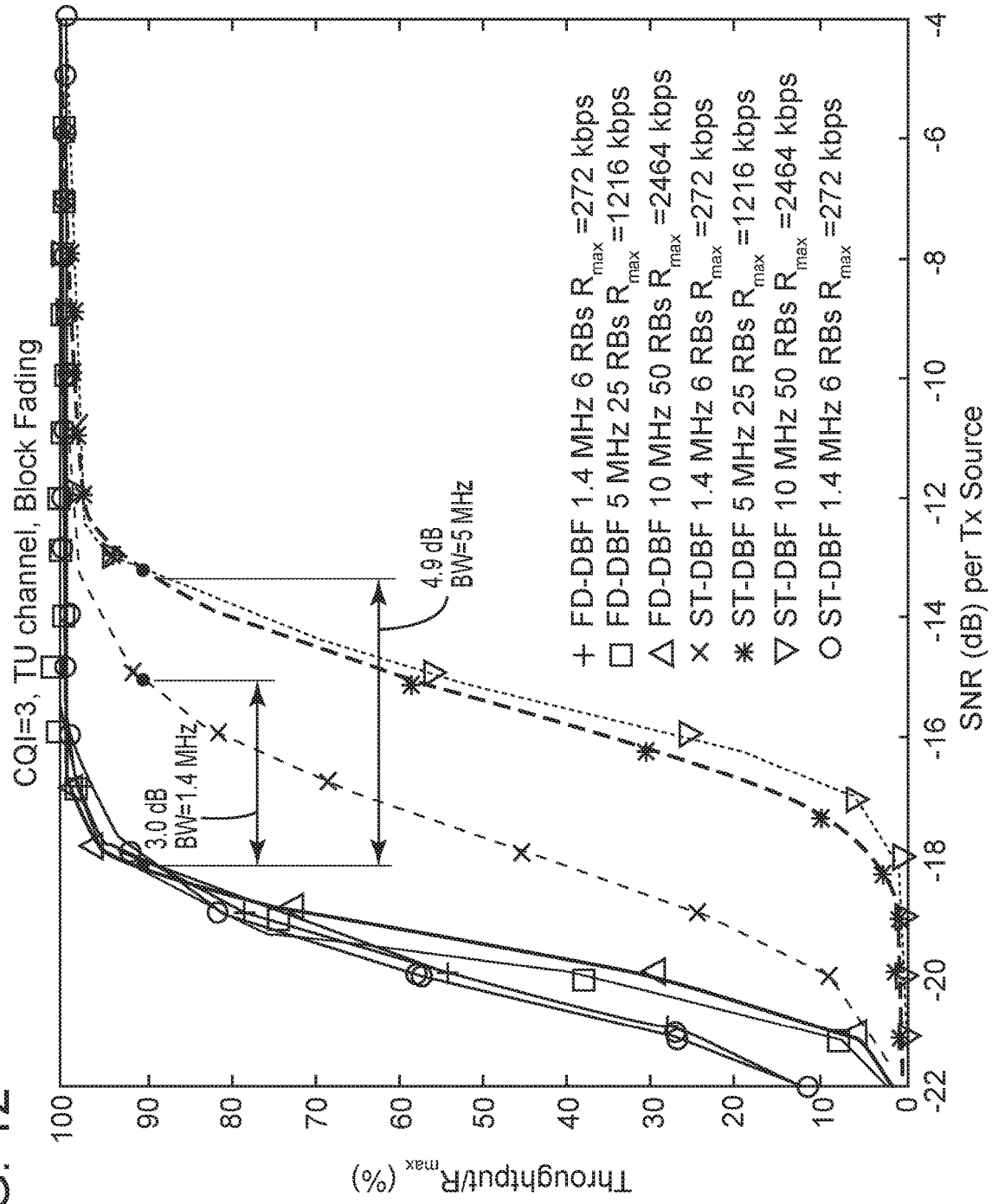
FIG. 12 depicts an example of a comparison of FD-DBF and ST-DBF for N=8 in accordance with aspects of the present invention.

Referring to FIG. 12, an example of a comparison of FD-DBF and ST-DBF for N=8 is depicted, according to aspects of the present invention. FIG. 12 shows improvement of approximately 3.0 dB for a 1.4 MHz uplink, and 4.9 dB for a 5 MHz uplink when using FD-DBF instead of ST-DBF.

FIG. 12 compares the FD-DBF and ST-DBF approaches for N=8 transmitters. For the 1.4 MHz LTE uplink (supporting a payload data rate of 272 kbps for CQI 3 for 6 resource blocks), the FD-DBF approach outperforms the ST-DBF approach by 3 dB. For the same TU channel model, as it is expanded to a 5 MHz LTE uplink (supporting a payload data rate of up to 1216 kbps for 25 resource blocks using the same CQI 3), the FD-DBF approach outperforms ST-DBF by 4.9 dB. Thus, the ST-DBF method only achieves 15.6 dB of gain when using 8 transmit elements, compared with the 20.5 dB of gain that can be achieved with the same 8 transmitters when using FD-DBF.

Referring again to FIG. 10, a comparison of the performance of FD-DBF, ST-DBF, and TD-DBF without spreading for a 1.4 MHz (6 resource block) uplink, showing that with 32 temporal taps, the TD-DBF approach yields approximately the same results as FD-DBF, and ST-DBF suffers relative to both of them by 2-3 dB in the TU channel. When DS spreading is applied, first using simply a cover with 128 chips per symbol period (spreading the 1.4 MHz LTE waveform into a bandwidth of 1.92 MHz, and obscuring the CP and well-known reference symbols), then with 4096 chips per symbol period, (for a spread bandwidth of 61.44 MHz), we see that performance is slightly improved over the un-spread cases. This is due to the diversity afforded by the use of additional spreading bandwidth. FIG. 10 also shows how performance can be further improved (reducing the required transmit power per node), by using multi-element processing at the EDA to permit operation at lower SNR and mitigate jamming. In the case of $M_{rx}$=4, as shown in FIG. 10, approximately 4 dB of further improvement is achieved in the TU channel.

Figure 13:
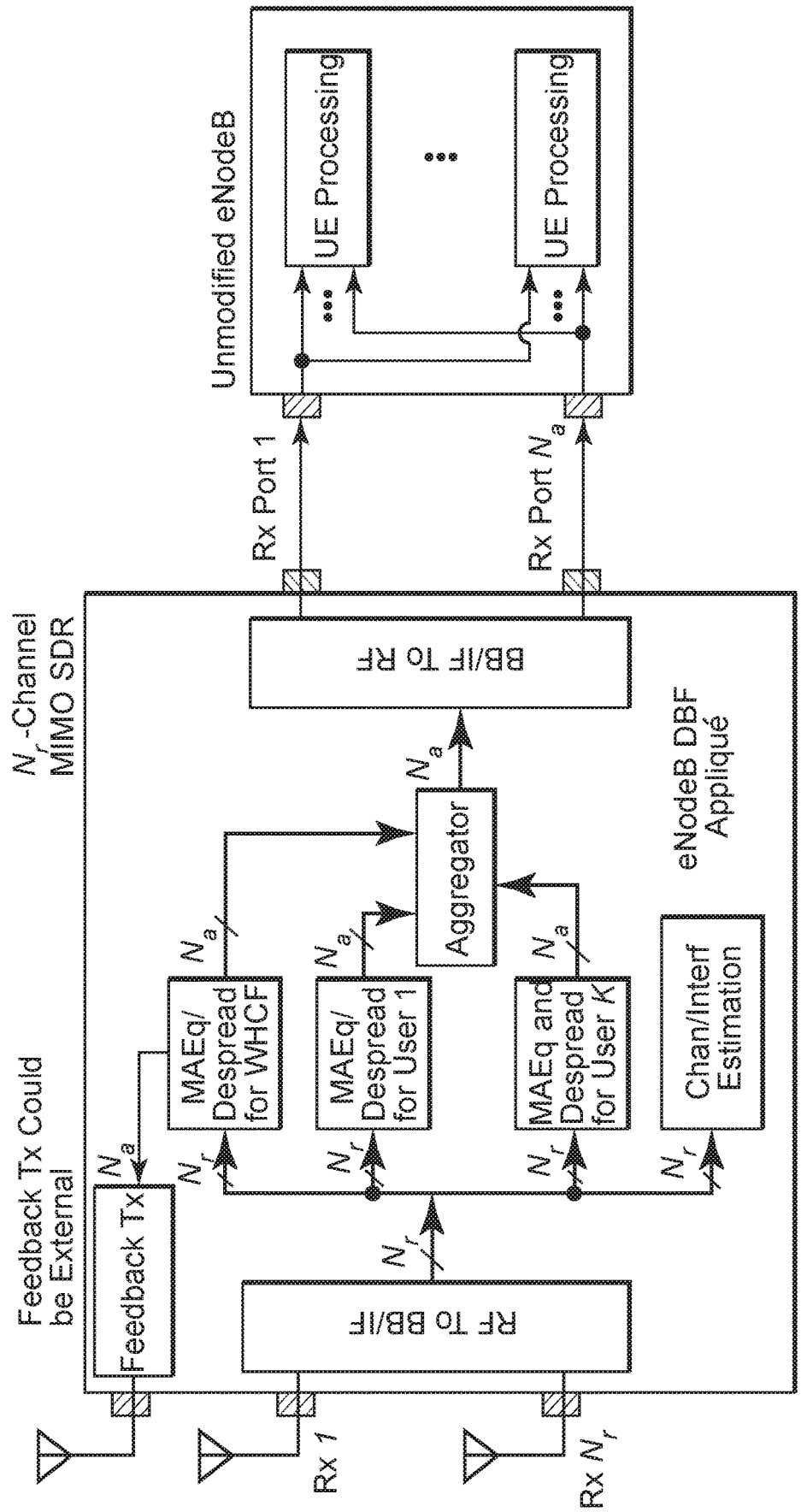
FIG. 13 depicts an example of a block diagram of an eNodeB DBF Appliqué (EDA) to provide channel state feedback to enable DBF in accordance with aspects of the present invention.

In a later section, it will be discussed how the coherent use of $N_{tx}$ transmit antennas reduces the signature at a threat receiver by $10 \log_{10} N_{tx}$ dB relative to the single-emitter case for the same emitter-to-intended-receiver range and data rate. By combining FD-DBF distributed transmit beamforming, DS and/or FH spreading, and receive beamforming technologies, we can reduce the power spectral density available to an adversary. For example, Table 3 shows that based on the above simulations, for $M_{rx}$=1 and $N_{tx}$=1 with no spreading, the required transmit power is 13.7 dBm and the signal is detectable by the threat receiver at ranges up to 882 m, corresponding to a circular detection area of 2.4 km². Under the same propagation conditions, with $M_{rx}$=4 and $N_{tx}$=8 the total transmit power from the cluster is −2.4 dBm (a reduction of 16.1 dB). With DS spreading using a chip rate of 61.44 Mchips/sec, we can reduce the power spectral density by additional 16.5 dB. For $M_{rx}$=4 and $N_{tx}$=8, without spreading the interceptor would need to be within 348 m of the source cluster (detection area of 0.4 km²), and with spreading, the interceptor would need to be within 135 m of the source (detection area of 0.1 km²).

eNodeB with a channel estimation appliqué as shown in FIG. 13, which also handles per-node power control. In

TABLE 3

Received power at an interceptor using combined distributed transmit beamforming, optimal receiver combining, and DS spreading.

|  |  | A. $M_{rx} = 1$, $N_{tx} = 1$, no spreading (1.4 MHz BW) | B. $M_{rx} = 1$, $N_{tx} = 8$, no spreading (1.4 MHz BW) | C. $M_{rx} = 4$, $N_{tx} = 8$, no spreading (1.4 MHz BW) | D. $M_{rx} = 4$, $N_{tx} = 8$, with spreading (61.44 MHz BW) |  |
|---|---|---|---|---|---|---|
| Intended Link | Occupied RF Bandwidth | 1.4 | 1.4 | 1.4 | 61.44 | MHz |
|  | Required SNR/ Tx Node (TU Channel) | 2.3 | −18.2 | −22.9 | −22.9 | dB |
|  | Rx Power Per Tx Node | −106.3 | −126.7 | −131.4 | −131.4 | dBm |
|  | Example Path Loss (Each Tx Node to Rx) | 120.0 | 120.0 | 120.0 | 120.0 | dB |
|  | Tx Power per Tx Node | 13.7 | −6.7 | −11.4 | −11.4 | dBm |
|  | Total Tx Power per CG | 13.7 | 2.3 | −2.4 | −2.4 | dBm |
|  | Tx Power Spectral Density per CG | 12.3 | 0.9 | −3.8 | −20.3 | dBm/ MHz |
|  | Reduction in PSD wrt Case A |  | 11.4 | 16.1 | 32.6 | dB |
| Interceptor Link | Interceptor Noise Floor (2 dB NF) | −112.0 | −112.0 | −112.0 | −112.0 | dBm/ MHz |
|  | Received Signal PSD for SNR = 0 dB | −112.0 | −112.0 | −112.0 | −112.0 | dBm/ MHz |
|  | Max PL between Interceptor and Tx | 124.3 | 112.8 | 108.1 | 91.7 | dB |
|  | Max Tx to Interceptor Range | 882.2 | 457.2 | 348.8 | 135.3 | m, PL∝ $(d/dref)^4$ |
|  | Circular Detection Area | 2.4 | 0.7 | 0.4 | 0.1 | km² |
|  | Reduction in Det. Area wrt Case A |  | 73.1 | 84.4 | 97.6 | % |

Channel State Feedback and Adaptive Power Control

Referring to FIG. 13, an example of a block diagram of an eNodeB DBF Appliqué (EDA) to provide channel state feedback to enable DBF is depicted, according to aspects of the present invention.

DBF implies that each node has knowledge of the time-varying channel between each transmitter and the intended receiver. For Time Division Duplex (TDD) systems, this information can be obtained at each CG member by monitoring the downlink channel from the eNodeB. For Frequency Division Duplex (FDD) systems, typically the channel from each transmit node is estimated at the intended receiver, and the information is sent back to each transmitting node via a feedback channel. LTE can be implemented with both FDD and TDD variants. For FDD LTE implementations, a standard LTE eNodeB will sense the aggregate channel between the effective CG data source and the receiver, rather than the individual channels, $\tilde{h}_{m,n,k}$, from transmitter n to receiver m, for frequency index k. Likewise, power control feedback from unmodified eNodeB will refer to the aggregate signal, not the emission from each CG node. Therefore, for FDD systems, it is necessary to augment the addition, each transmitting node embeds a unique channel sounding waveform into the transmitted signal which can be extracted at the eNodeB DBF Appliqué (EDA). The EDA illustrated in FIG. 13 further supports multi-antenna operation, to further reduce the required CG transmit power and mitigate interference, along with DS/HF de-spreading. Simpler EDA implementations are also possible.

Figure 14:
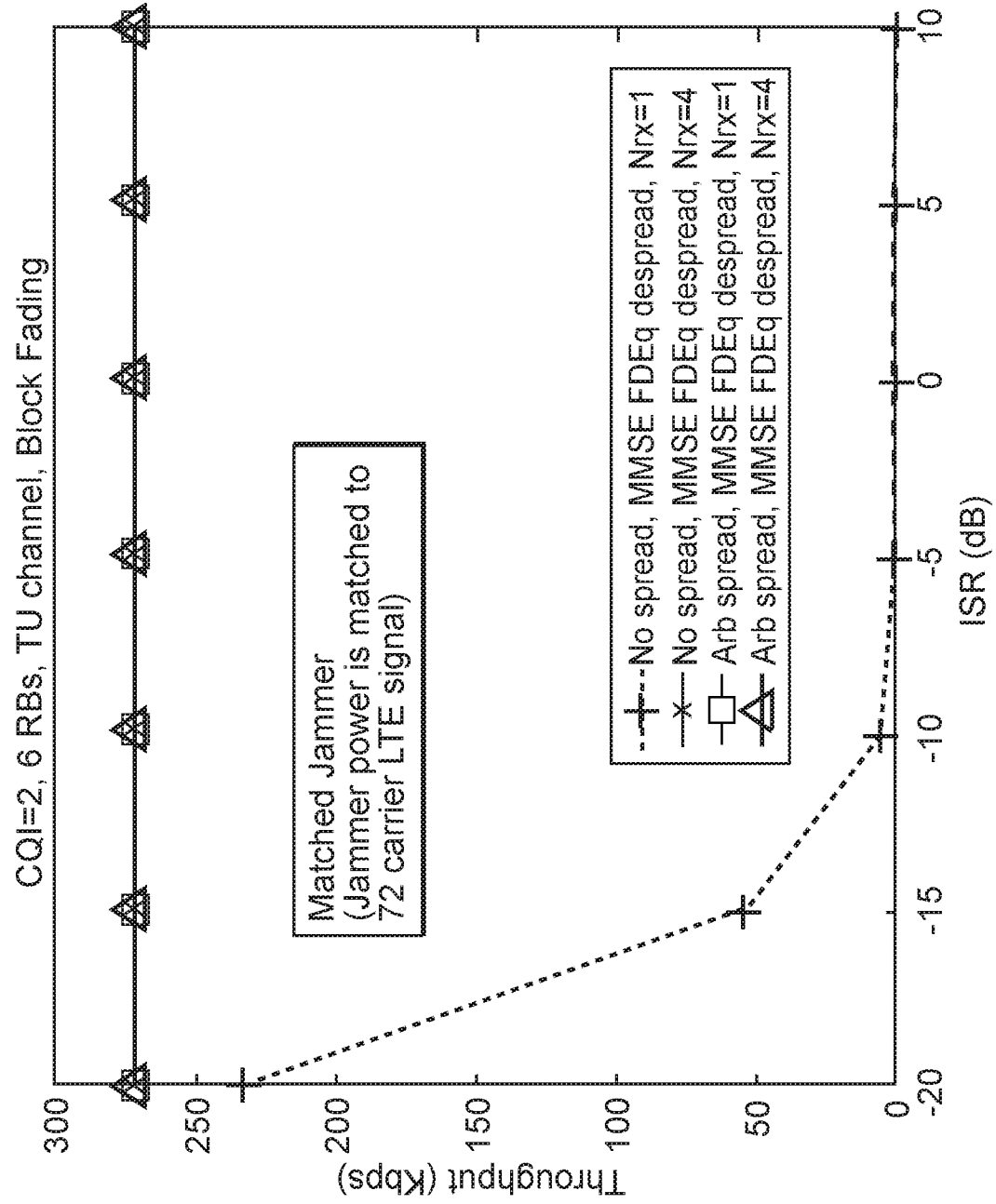
FIG. 14 depicts an example of performance of an EDA receiver with a single source, $N_{rx}=1$ and 4, with and without spreading in the presence of jamming in accordance with aspects of the present invention.

Referring to FIG. 14, an example of performance of an EDA receiver with a single source, $N_{rx}=1$ and 4, with and without spreading in the presence of jamming is depicted, according to aspects of the present invention. FIG. 14 shows the performance of the EDA-enhanced eNodeB with spreading and multi-node reception in the presence of a spectrum-matched LTE jammer. In order to minimize the data rate of the feedback channel, CSI encoding schemes using techniques such as Grassmannian Line Packing (GLP) can be used. Previous work showed that feeding back as few as 3 bits per channel component resulted in negligible loss compared with feeding back floating-point complex CSI data.

Downlink DBF Operation

Figure 15A:
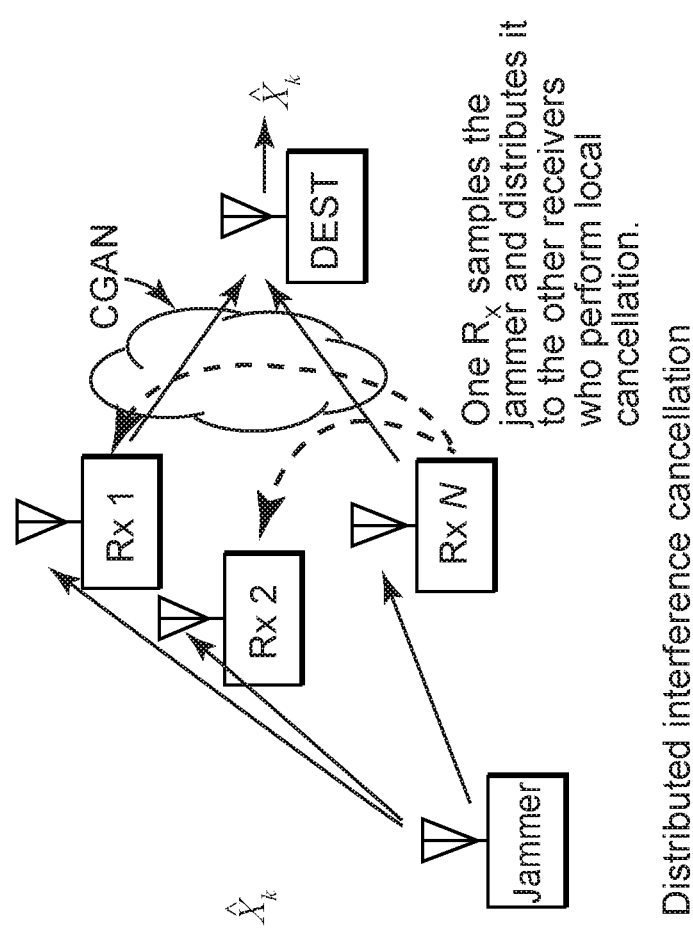
FIG. 15A depicts an example of a distributed receive beaming approach for mitigating interference on the downlink using a CGAN-connected CG in accordance with aspects of the present invention.

Referring to FIG. 15A, an example of a distributed receive beaming approach for mitigating interference on the downlink using a CGAN-connected CG is depicted, according to aspects of the present invention. Also Referring to FIG. 15B, an example of a distributed interference cancellation approach for mitigating interference on the downlink using a CGAN-connected CG is depicted, according to aspects of the present invention.

In the previous section, the resources of the cluster were used to create a virtual transmit array with many elements. The cluster's resources can also be used to synthesize a virtual receive array to achieve range extension and to mitigate interference/jamming. In this approach, a representation of the received signals, $s_{R,n}$ is exchanged over the CGAN, and processed for delivery to the intended destination node as shown in FIGS. 7 and 8.

Figure 15B:
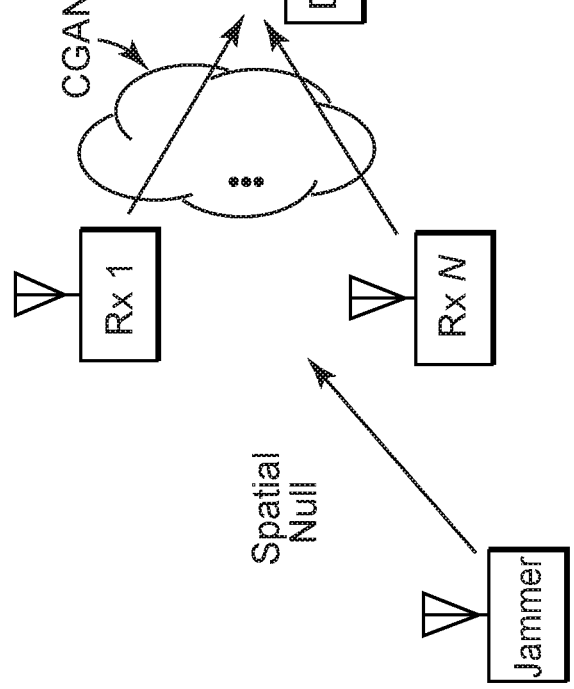
FIG. 15B depicts an example of a distributed interference cancellation approach for mitigating interference on the downlink using a CGAN-connected CG in accordance with aspects of the present invention.

FIGS. 15A and 15B show two interference mitigation methods enabled by the CGAN. By distributing signals to all receive nodes, the receiver system can apply coherent distributed receive processing to null jamming, which enables protection of UE nodes on the downlink as shown in FIG. 15A. A cluster-based reception solution mitigated interference using approach is shown in FIG. 15B, in which one sensor samples the jamming signal and distributes it for subtractive cancellation at each node. This approach requires a much lower CGAN data rate compared with coherent nulling since only a single pre-detection waveform is broadcast to the other nodes.

Detectability of Uplink DBF Signals

As previously asserted, because the total power transmitted by the N-node CG cluster is lower by approximately 1/N compared with a single node transmitter attempting to close the same link, the signal is harder for an adversary to detect. In this section, this concept is re-visited from MIMO first principles.

A set of transmit antennas that exploit spatial channel information (the Informed Transmitter, or IT mode) is fundamentally harder for an adversary to detect than a conventional single-aperture transmitter or a non-coherent transmit array supporting the same data rate. For the IT case, the transmitter is able to adapt its transmit signal to match the channel. Here, the detectability of a low power MIMO emission by an adversary is addressed. The primary link between the transmitter and the desired receiver uses N transmit sources and $M_p$ receive sensors. The capacity of the primary MIMO link may be calculated using:

$$C = \log_2\left(\left|I + \frac{G_p}{\sigma_p^2} H_p \Phi_T H_p^H\right|\right) \quad (7)$$

Where $\sigma_p^2$ is the noise variance for the primary receiver, $\Phi_T$ is the correlation matrix of the transmitted signal, and $H_p$ is $M_p \times N$ channel matrix for the primary channel, and $G_p$ is the path gain for the primary channel. It is assumed that a secondary receiver (i.e. a threat receiver) observes the transmitter through a channel $H_s$ using $M_s$ receive sensors. The primary and secondary channels are normalized so that $E\{\|H_p\|_F^2\}=NM_p$ and $E\{\|H_s\|_F^2\}=NM_s$.

The adversary receiver (assumed here to be a multi-antenna energy detector) takes the trace of the received correlation matrix $R_s$ over all of its $M_s$ receive sensors to form its detection metric, $$Z = tr(R_s) = tr(R_d) + tr(R_n) = Z_d + Z_n = tr(H_s \Phi_T H_s^H) + Z_n \quad (8)$$

A detection occurs when $Z > T$ where T is typically set using a constant false alarm rate. If the noise at each secondary receiver sensor is complex Gaussian with variance, $\sigma_p^2$, then the noise contribution to detection metric is a chi-squared random variable with $2LM_s$ degrees of freedom where L is the number of samples that the adversary uses to form the decision metric.

For the IT case, the transmitter adapts to the transmit spatial covariance matrix to match the channel. In the low-SNR case, as long as the capacity is below the cut-off capacity for the second mode, only a single mode will be used, and $$C_{IT} = \log_2(1 + \lambda_0 \rho) \approx \frac{\lambda_0 \rho}{\ln 2} \quad (9)$$

Where $\lambda_0$ is the largest eigenmode of $H_p H_p^H$ for the primary channel and we've taken advantage of the low-SNR approximation for the capacity expression. A single eigenmode is used for the primary channel whenever the desired capacity is less than the cutoff capacity for the second mode and the transmitter uses tap weights $w=v_{p,0}$ where $v_{p,0}$ is the eigenvector corresponding to the dominant eigenmode of $H_p H_p^H$. When the primary channel is mostly specular, we can make the approximation $\lambda_0 \approx M_p N$.

For the case of dominant-eigenmode transmission, $w=v_{p,0}$, and with the assumption, $\lambda_0 \approx M_p N$, the required SNR is $$\rho \approx \frac{C_{IT} \ln 2}{\lambda_0} = \frac{C_{IT} \ln 2}{M_p N} \quad (10)$$

The transmitted power for the primary link is $$P_T = \frac{\rho \sigma_p^2}{10^{-\frac{L_{i,dB}}{10}} 10^{-\frac{L_{p,dB}}{10}}} = \frac{\rho \sigma_p^2}{G_i G_p} = \frac{\sigma_p^2 C_{IT} \ln 2}{G_i G_p M_p N} \quad (11)$$

Where $L_{p,dB}=-10 \log_{10}(G_p)$ is the path loss for the primary link in dB and $L_{i,dB}=-10 \log_{10}(G_i)$ is the implementation loss relative to the capacity bound.

Figure 16:
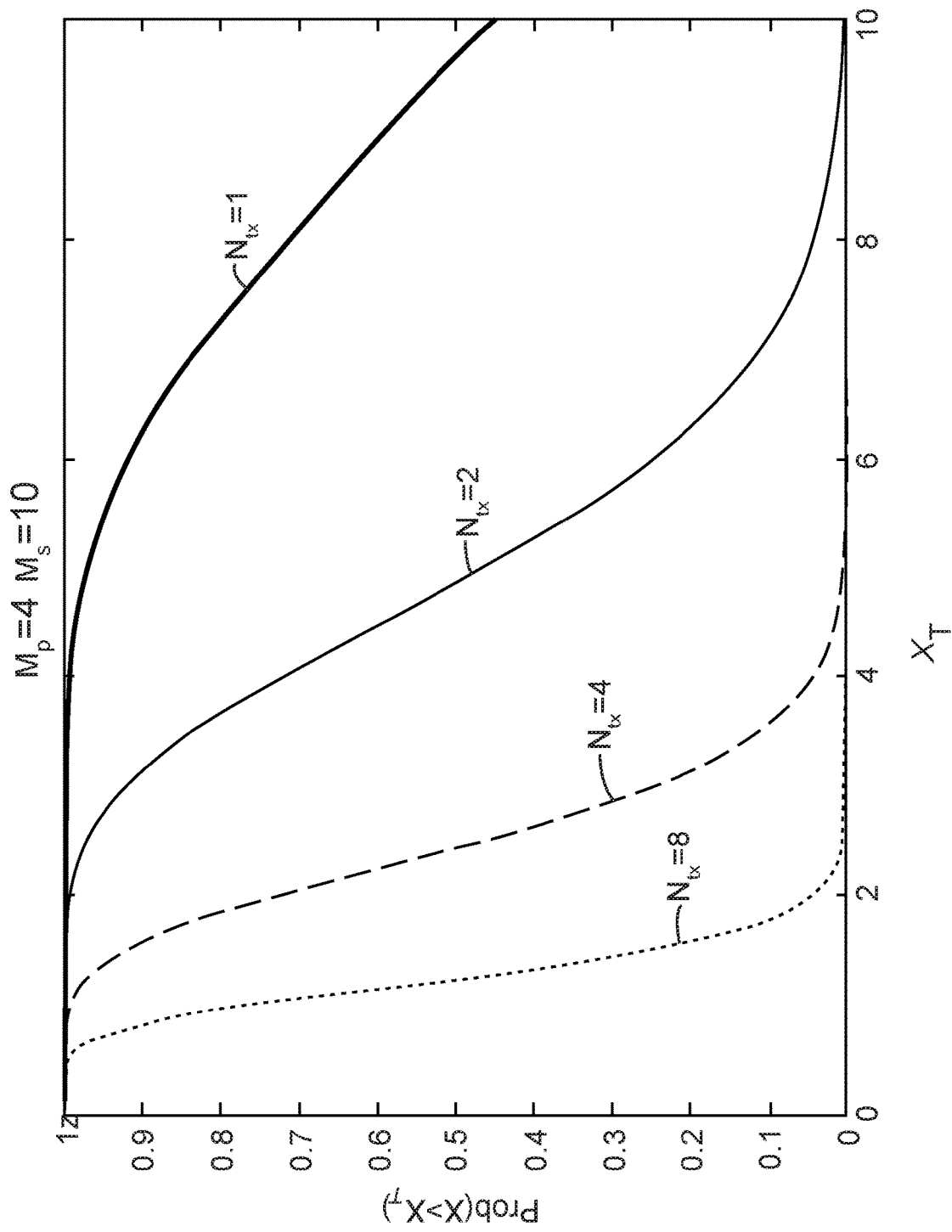
FIG. 16 depicts an example of plots of probability of detection for different values of $N_{rx}$ for an IT case in accordance with aspects of the present invention.

Referring to FIG. 16, an example of plots of probability of detection for different values of $N_{tx}$ for an IT case is depicted, according to aspects of the present invention.

If the secondary channel consists of unit variance circular complex Gaussian values, then the desired component of the detection metric at the adversary is:

$$Z_d = tr(H_s \Phi_T H_s^H) = tr(h_s h_s^H) G_s P_T \quad (12)$$

$$= \|h_s\|^2 \frac{\sigma_p^2 C_{IT} \ln 2}{M_p N} \frac{G_s}{G_p G_i}$$

$$= X \frac{\sigma_p^2 C_{IT} \ln 2}{M_p} \frac{G_s}{G_p G_i}$$

Where $L_{s,dB}=-10 \log(G_s)$ is the transmission loss associated with the secondary channel and $h_s = H_s w = H_s v_{p,0}$. If the dominant eigenmode of the primary channel is fixed (non-random), then the variable $X=\|h_s\|^2/N$ is a scaled $\chi^2$ random variable with $2M_s$ degrees of freedom. A detection occurs when $Z_d > T$ which is equivalent to $X > X_T$ where $$X_T = \frac{M_p T}{\sigma_p^2 C_{IT} \ln 2} \frac{G_i G_p}{G_s} \quad (13)$$

and $X \sim \chi_{2M_s}^2/(2N)$, and the probability of detection is the probability that X is greater than $X_T$, $P(X>X_T)$, as shown in FIG. 16. For a given probability of detection, and values of $M_p$ and $M_s$, we can calculate the corresponding threshold at a receiver as a function of N, $$X_T(N) = P^{-1}(P_d, M_p, M_s) \quad (14)$$

The threshold $X_T(N)$, in turn, is related to the allowable path loss between the source array and the secondary receiver. For a wide range of detection probabilities $X_T(8)/X_T(1) \approx 8$, which implies that, in order to maintain the same probability of detection, the secondary receiver needs a path loss, $G_s$, that is 10 $\log_{10} 8 = 9$ dB less in the case of N=8 compared with N=1, thus using 8 transmit elements at the emitter makes it 9 dB more difficult for the secondary receiver to detect the emitter. For a path loss exponent of $\alpha=4$, this means that the area where an adversary can be located to detect the emitter in the case of N=8 is 65% smaller than the area over which the same adversary could be located to detect a single-antenna emitter operating at the same data rate, at the same range from its intended receiver. The difference between the 65% reduction shown here, and the 73% reduction in case B in Table 3 is due to differences in propagation conditions (Table 3 was based on simulation using the TU model). As shown in Table 3, by combining coherent transmit beamforming with DS spreading and receive spatial processing, we can reduce the adversary's operating area even further.

Computer System and Computer Program Product

Figure 17:
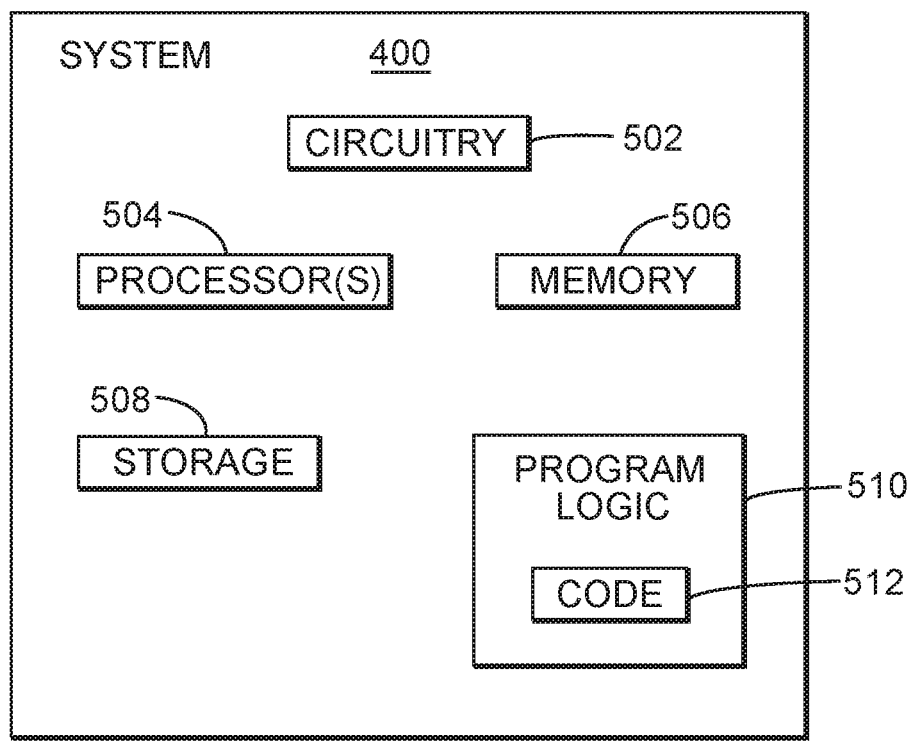
FIG. 17 depicts an example of a block diagram of a computer system in accordance with aspects of the present invention.
Figure 18:
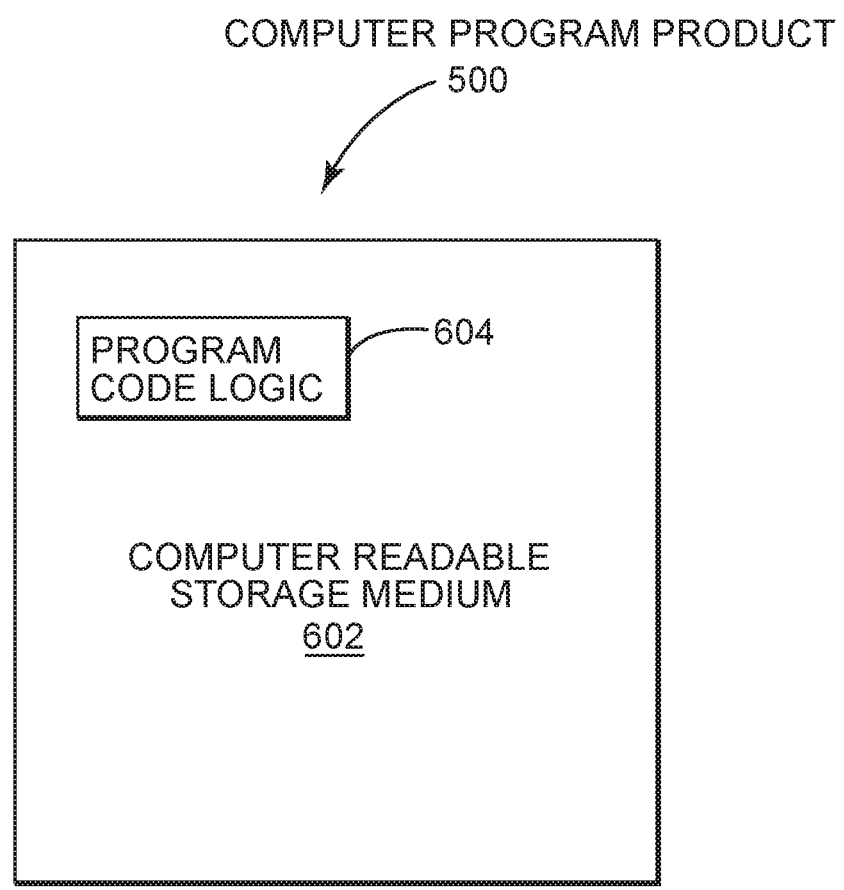
FIG. 18 depicts an example of a computer program product in accordance with aspects of the present invention.

The following FIGS. 17-18 and the following disclosure associated with those figures depict aspects in accordance with the present invention, of computer systems and/or computer program products utilized to implement DBF methods and devices for transmitting distributed data.

FIG. 17 illustrates a block diagram of a resource 400 in computer system, such as, which is part of the technical architecture of certain embodiments of the invention. Returning to FIG. 17, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 17 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 400 to execute software, computer readable code or instructions, does not limit where this code can be stored. Referring to FIG. 18, in one example, a computer program product 500 includes, for instance, one or more non-transitory computer readable storage media 602 to store computer readable program code means or logic 604 thereon to provide and facilitate one or more aspects of the invention.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the invention may be provided, offered, deployed, managed, serviced, etc. by a service provider who offers management of customer environments. For instance, the service provider can create, maintain, support, etc. computer code and/or a computer infrastructure that performs one or more aspects of the invention for one or more customers. In return, the service provider may receive payment from the customer under a subscription and/or fee agreement, as examples. Additionally or alternatively, the service provider may receive payment from the sale of advertising content to one or more third parties.

In one aspect of the invention, an application may be deployed for performing one or more aspects of the invention. As one example, the deploying of an application comprises providing computer infrastructure operable to perform one or more aspects of the invention.

As a further aspect of the invention, a computing infrastructure may be deployed comprising integrating computer readable code into a computing system, in which the code in combination with the computing system is capable of performing one or more aspects of the invention.

As yet a further aspect of the invention, a process for integrating computing infrastructure comprising integrating computer readable code into a computer system may be provided. The computer system comprises a computer readable medium, in which the computer medium comprises one or more aspects of the invention. The code in combination with the computer system is capable of performing one or more aspects of the invention.

Further, other types of computing environments can benefit from one or more aspects of the invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A computer implemented method of transmitting distributed data over a channel, the method comprising:
   distributing data from a data source to N number of collaborating transmitter devices, the N number of transmitter devices operable to synchronously transmit N number of contributing data signals based on the data to a receiver over a channel;
   obtaining channel state information (CSI) of the channel between each transmitter device and the receiver;
   determining a spatial spectral weight (SSW) filter for each transmitter device based on the obtained channel state information;
   applying the SSW filter associated with each transmitter device to each contributing data signal transmitted from the associated transmitter device;
   transmitting through the channel, and to the receiver, the N number of contributing data signals filtered by the SSW filters, such that the contributing data signals are received at the receiver synchronously and in substantial phase alignment such that the contributing data signals coherently combine to form a coherently combined data signal;
   receiving, at each of the N number of transmitter devices, a downlink data signal that was transmitted from the receiver;
   determining a downlink spatial spectral weight (DSSW) filter for each transmitter device based on the CSI;
   applying the DSSW filter associated with each transmitter device to each downlink data signal received at the associated transmitter device; and
   coherently combining the N number of downlink data signals filtered by the DSSW filters to form a coherently combined downlink data signal at the data source.

2. The method of claim 1, comprising:
   operating each transmitter device at a maximum transmit power in order to transmit the contributing data signals over a maximum transmission range;
   wherein, the coherently combined data signal has a coherently combined power at the receiver that is greater than the power that would have been received at the receiver of a contributing data signal, if that contributing data signal were transmitted from a single transmitter device operating at the sum total of the maximum transmit power of each transmitter device.

3. The method of claim 2, wherein the coherent combined data signal has a coherently combined power at the receiver that is equal to or greater than the 50% of N times the sum total of the maximum transmit power of each transmitter device.

4. The method of claim 2, wherein the coherent combined data signal has a coherently combined power at the receiver that is equal to or greater than the 75% of N times the sum total of the maximum transmit power of each transmitter device.

5. The method of claim 1, comprising:
   operating each transmitter device at a substantially equal maximum transmit power in order to transmit the contributing data signals over a maximum transmission range; and
   wherein, the coherently combined data signal has a coherently combined power at the receiver that is greater than N times and less than or equal to N squared times the power that would have been received at the receiver of a contributing data signal, if that contributing data signal were transmitted from a single transmitter device operating at the maximum transmit power of the device.

6. The method of claim 5, wherein the coherent combined data signal has a coherently combined power at the receiver that is equal to or greater than 50% of N squared times the maximum transmit power.

7. The method of claim 1, wherein the data source of the data is one of the transmitting devices.

8. The method of claim 1, comprising:
   operating each transmitter device at a transmit power in order to transmit the contributing data signals over a fixed transmission range;
   wherein the sum total of the transmit power of each transmitter device is less than the required power of any single transmitter device of the N number of transmitter devices to transmit its contributing data signal alone over the same fixed transmission range.

9. The method of claim 8, wherein the sum total of the transmit power of each transmitter device is less than or equal to 75% of the required power of any single transmitter device of the N number of transmitter devices to transmit its contributing data signal alone over the same fixed transmission range.

10. The method of claim 8, wherein the sum total of the transmit power of each transmitter device is less than or equal to 50% of the required power of any single transmitter device of the N number of transmitter devices to transmit its contributing data signal alone over the same fixed transmission range.

11. A computerized system for transmitting distributed data over a channel, the system comprising N number of collaborating transmitter devices in a collaborating group, the each transmitter device comprising:
- a distributed beamforming (DBF) signal processing system comprising at least one processor;
- a user equipment (UE) device interfaced with the DBF signal processing system, the UE device configured to transmit data to the DBF signal processing system; and
- a collaborating group area network communications device (CGAN comms) interfaced with the DBF signal processing system, the CGAN comms configured to transmit data to the N number of transmitter devices over a collaborating group area network (CGAN); and
- wherein the transmitter devices of the collaborating group process data transmitted from a data source, the processing comprising:
  - distributing the data from the data source to the N number of collaborating transmitter devices, the N number of transmitter devices operable to synchronously transmit N number of contributing data signals based on the data from the data source to a receiver over a channel,
  - obtaining channel state information (CSI) of the channel between each transmitter device and the receiver,
  - determining a spatial spectral weight (SSW) filter for each transmitter device based on the obtained channel state information,
  - applying the SSW filter associated with each transmitter device to each contributing data signal transmitted from the associated transmitter device, and
  - transmitting through the channel, and to the receiver, the N number of contributing data signals filtered by the SSW filters, such that the contributing data signals are received at the receiver synchronously and in substantial phase alignment such that the contributing data signals coherently combine to form a coherently combined data signal;
- wherein at least one transmitter device of the collaborating group comprises:
  - the UE device comprised as an LTE UE device, the LTE UE device configured to internally modulate digital data into an analog contributing data signal in the form of an LTE waveform; and
  - the DBF signal processing system comprised as an LTW DBF Applique, the LTE DBF Appliqué configured to:
    - receive the contributing data signal from the LTE UE device,
    - distribute the contributing data signal to the N number of collaborating transmitter devices, and
    - apply a SSW filter to the contributing data signal prior to transmitting the contributing data to the receiver.

12. The computerized system of claim 11, wherein the processing further comprises:
- operating each transmitter device at a maximum transmit power in order to transmit the contributing data signals over a maximum transmission range;
- wherein, the coherently combined data signal has a coherently combined power at the receiver that is greater than the power that would have been received at the receiver of a contributing data signal, if that contributing data signal were transmitted from a single transmitter device operating at the sum total of the maximum transmit power of each transmitter device.

13. The computerizes system of claim 12, wherein the coherent combined data signal has a coherently combined power at the receiver that is equal to or greater than the 50% of N times the sum total of the maximum transmit power of each transmitter device.

14. The computerized system of claim 11, wherein the processing further comprises:
- operating each transmitter device at a transmit power in order to transmit the contributing data signals over a fixed transmission range;
- wherein the sum total of the transmit power of each transmitter device is less than the required power of any single transmitter device of the N number of transmitter devices to transmit its contributing data signal alone over the same fixed transmission range.

15. The computerized system of claim 11, wherein the LTE DBF Appliqué further configured to:
- receive a downlink data signal transmitted from the receiver,
- receive downlink data signals from the other transmitter devices in the collaborating group,
- apply a downlink spatial spectral weight (DSSW) filter associated with each transmitter device to each downlink data signal received at the at least one transmitter device,
- coherently combine the downlink data signals filtered by the DSSW filters to form an analog coherently combined downlink data signal, and
- transmit the analog coherently combined downlink data signal to the UE device.

16. The computerized system of claim 11, wherein at least one transmitter device of the collaborating group comprises:
- the DBF signal processing system comprised as an IM-DBF system, the IM-DBF system configured to:
  - receive the digital data from the UE device,
  - distribute the digital data to the N number of collaborating transmitter devices,
  - internally modulate the digital data into analog data, and
  - apply a SSW filter to the analog data prior to transmitting the analog data to the receiver.

17. The computerized system of claim 16, wherein the IM-DBF system is further configured to:
- receive a downlink data signal transmitted from the receiver,
- receive downlink data signals from the other transmitter devices in the collaborating group,
- apply a downlink spatial spectral weight (DSSW) filter associated with each transmitter device to each downlink data signal received at the at least one transmitter device,
- coherently combining the downlink data signals filtered by the DSSW filters to form an analog coherently combined downlink data signal,
- demodulate the coherently combined downlink data signal to a digital downlink data signal, and
- transmit the digital coherently combined downlink data signal to the UE device.

18. The computerized system of claim 11, wherein the DBF signal processing systems of the transmitter devices are configured to spread the contributing data signals associated with the transmitting devices.

19. A computerized system for transmitting distributed data over a channel, the system comprising N number of collaborating transmitter devices in a collaborating group, the each transmitter device comprising:

a distributed beamforming (DBF) signal processing system comprising at least one processor;

a user equipment (UE) device interfaced with the DBF signal processing system, the UE device configured to transmit data to the DBF signal processing system; and a collaborating group area network communications device (CGAN comms) interfaced with the DBF signal processing system, the CGAN comms configured to transmit data to the N number of transmitter devices over a collaborating group area network (CGAN); and wherein the transmitter devices of the collaborating group process data transmitted from a data source, the processing comprising:

distributing the data from the data source to the N number of collaborating transmitter devices, the N number of transmitter devices operable to synchronously transmit N number of contributing data signals based on the data from the data source to a receiver over a channel, obtaining channel state information (CSI) of the channel between each transmitter device and the receiver, determining a spatial spectral weight (SSW) filter for each transmitter device based on the obtained channel state information, applying the SSW filter associated with each transmitter device to each contributing data signal transmitted from the associated transmitter device, and transmitting through the channel, and to the receiver, the N number of contributing data signals filtered by the SSW filters, such that the contributing data signals are received at the receiver synchronously and in substantial phase alignment such that the contributing data signals coherently combine to form a coherently combined data signal;

wherein at least one transmitter device of the collaborating group comprises the DBF signal processing system comprised as an IM-DBF system, the IM-DBF system configured to:

receive the digital data from the UE device, distribute the digital data to the N number of collaborating transmitter devices, internally modulate the digital data into analog data, apply a SSW filter to the analog data prior to transmitting the analog data to the receiver;

receive a downlink data signal transmitted from the receiver, receive downlink data signals from the other transmitter devices in the collaborating group, apply a downlink spatial spectral weight (DSSW) filter associated with each transmitter device to each downlink data signal received at the at least one transmitter device, coherently combining the downlink data signals filtered by the DSSW filters to form an analog coherently combined downlink data signal, demodulate the coherently combined downlink data signal to a digital downlink data signal, and transmit the digital coherently combined downlink data signal to the UE device.

* * * * *